(12) United States Patent
Marrero et al.

(10) Patent No.: US 12,541,570 B2
(45) Date of Patent: Feb. 3, 2026

(54) UNSUPERVISED DOMAIN ADAPTATION WITH NEURAL NETWORKS

(71) Applicant: Nvidia Corporation, Santa Clara, CA (US)

(72) Inventors: David Acuna Marrero, Toronto (CA); Guojun Zhang, Waterloo (CA); Marc Law, Ontario (CA); Sanja Fidler, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/656,298

(22) Filed: May 6, 2024

(65) Prior Publication Data

US 2024/0296205 A1 Sep. 5, 2024

Related U.S. Application Data

(63) Continuation of application No. 17/226,534, filed on Apr. 9, 2021, now Pat. No. 11,989,262.
(Continued)

(51) Int. Cl.
*G06F 18/214* (2023.01)
*G06F 18/21* (2023.01)
(Continued)

(52) U.S. Cl.
CPC ........ *G06F 18/2148* (2023.01); *G06F 18/217* (2023.01); *G06F 18/241* (2023.01);
(Continued)

(58) Field of Classification Search
CPC .......... G06V 10/40; G06V 10/82; G06N 3/08; G06N 3/045; G06F 18/217; G06F 18/241; G06F 18/2148
See application file for complete search history.

(56) References Cited

U.S. PATENT DOCUMENTS 11,544,535 B2  1/2023  Lee
2018/0218284 A1  8/2018  Jawahar et al.
(Continued)

FOREIGN PATENT DOCUMENTS

CN  107977703 A  5/2018
CN  108388914 A  8/2018
(Continued)

OTHER PUBLICATIONS

Non-Final Office Action issued in U.S. Appl. No. 17/226,534, mailed May 4, 2023.
(Continued)

*Primary Examiner* — Daniel G Mariam
(74) *Attorney, Agent, or Firm* — Hogan Lovells US LLP

(57) ABSTRACT

Approaches presented herein provide for unsupervised domain transfer learning. In particular, three neural networks can be trained together using at least labeled data from a first domain and unlabeled data from a second domain. Features of the data are extracted using a feature extraction network. A first classifier network uses these features to classify the data, while a second classifier network uses these features to determine the relevant domain. A combined loss function is used to optimize the networks, with a goal of the feature extraction network extracting features that the first classifier network is able to use to accurately classify the data, but prevent the second classifier from determining the domain for the image. Such optimization enables object classification to be performed with high accuracy for either domain, even though there may have been little to no labeled training data for the second domain.

20 Claims, 17 Drawing Sheets

Related U.S. Application Data

(60) Provisional application No. 63/086,544, filed on Oct. 1, 2020.

(51) Int. Cl.
  *G06F 18/241* (2023.01)
  *G06N 3/045* (2023.01)
  *G06N 3/08* (2023.01)
  *G06V 10/40* (2022.01)

(52) U.S. Cl.
  CPC ............... *G06N 3/045* (2023.01); *G06N 3/08* (2013.01); *G06V 10/40* (2022.01)

(56) References Cited

U.S. PATENT DOCUMENTS

| | | |
|---|---|---|
| 2019/0046068 A1 | 2/2019 | Ceccaldi et al. |
| 2019/0049540 A1 | 2/2019 | Odry et al. |
| 2019/0361919 A1 | 11/2019 | Sahu et al. |
| 2020/0294287 A1 | 9/2020 | Schlemper et al. |
| 2021/0281491 A1* | 9/2021 | Yelahanka Raghuprasad ............. H04L 41/16 |
| 2021/0312674 A1 | 10/2021 | Abrol et al. |
| 2022/0277581 A1 | 9/2022 | Zhou et al. |
| 2022/0343631 A1 | 10/2022 | Namiki et al. |

FOREIGN PATENT DOCUMENTS

| | | |
|---|---|---|
| CN | 109934281 A | 6/2019 |
| EP | 3572980 A1 | 11/2019 |
| WO | 2018170512 A1 | 9/2018 |
| WO | 2019051356 A1 | 3/2019 |
| WO | 2019204547 A1 | 10/2019 |
| WO | 2020018819 A1 | 1/2020 |

OTHER PUBLICATIONS

Final Office Action issued in U.S. Appl. No. 17/226,534, mailed Sep. 20, 2023.

Notice of Allowance issued in U.S. Appl. No. 17/226,534, mailed Feb. 1, 2024.

Chivukula, "Game theoretical adversarial deep learning algorithms for robust neural network models", C02029: Doctor of Philosophy, pp. 1-212, 2007.

Chen et al., "Deep convolutional neural network for semantic image segmentation", Journal of Image and Graphics, vol. 25, No. 6, pp. 1069-1090 (22 total pages), 2020, DOI: 10.11834/jig.190355 (w-English abstract).

Wu et al., "Three-dimensional convolutional neural network based on spatial-spectral feature pictures learning for decoding motor imagery electroencephalography signal", Journal of Biomedical Engineering, vol. 41., No. 6, 2024, pp. 1145-1152 (8 total pages), http://www.biomedeng.cn (w-English abstract).

* cited by examiner

UNSUPERVISED DOMAIN ADAPTATION WITH NEURAL NETWORKS

CROSS-REFERENCE TO RELATED APPLICATIONS

This application is a continuation of U.S. patent application Ser. No. 17/226,534, filed Apr. 9, 2021, entitled "UNSUPERVISED DOMAIN ADAPTATION WITH NEURAL NETWORKS," which claims priority to U.S. Provisional Application No. 63/086,544, filed Oct. 1, 2020, entitled "UNSUPERVISED DOMAIN ADAPTATION WITH NEURAL NETWORKS," which are hereby incorporated herein in their entirety and for all purposes.

BACKGROUND

The ability to learn new concepts and skills from general-purpose data, and transfer these concepts and skills to similar scenarios, is critical in many modern applications, such as may involve machine learning. As an example, it is often the case that a learner has access to only a small, unlabeled subset of data on a given domain of interest, such as a type of environment or scene. The learning may have access, however, to a larger labeled dataset able to be used for the same task, but in a different domain than the target domain. If the differences between these two domains, often referred to as the "domain gap," is not considerable then it is possible to train a model using both the labeled and unlabeled data, and to generalize to the target dataset. Such a scenario can involve unsupervised domain adaptation. A problem with conventional approaches to unsupervised domain adaptation, however, arises in a variety of practical applications where the distribution of the training samples differs from the distribution of samples used at test or inference time. Conventional domain adaptation approaches determine generalization bounds based on divergence measures that are hard to optimize in practice. This has led to a large disconnect between theory and state-of-the-art methods.

BRIEF DESCRIPTION OF THE DRAWINGS

Various embodiments in accordance with the present disclosure will be described with reference to the drawings, in which.

DETAILED DESCRIPTION

Approaches in accordance with various embodiments can provide for training or transfer learning across multiple domains. In particular, neural networks can be trained using unsupervised domain adaptation to be effectively domain-agnostic. An example training approach utilizes three neural networks, including an encoding network and two classifier or discriminator networks. Using object recognition as an example, the encoder network can be trained using labeled images from a first domain and unlabeled images from a second domain to extract features related to a type of object, and encode those features into a latent space. A first object classifier network can utilize these features to attempt to classify the type of object. A second domain classifier network can use these features to attempt to classify or infer the domain in which that image was captured, or from which those features were extracted. The three networks can be trained together and optimized using a common loss function to attempt to arrive at a result where the object classifier is accurate, but the domain classifier is unable to determine the domain with any certainty. In this way, the encoder network learns to encode features that are domain-agnostic, so that the object classifier can produce accurate classifications for images from either domain. This approach can be extended to any types of tasks where inferences are made with respect to data in two or more domains.

Figure 1:
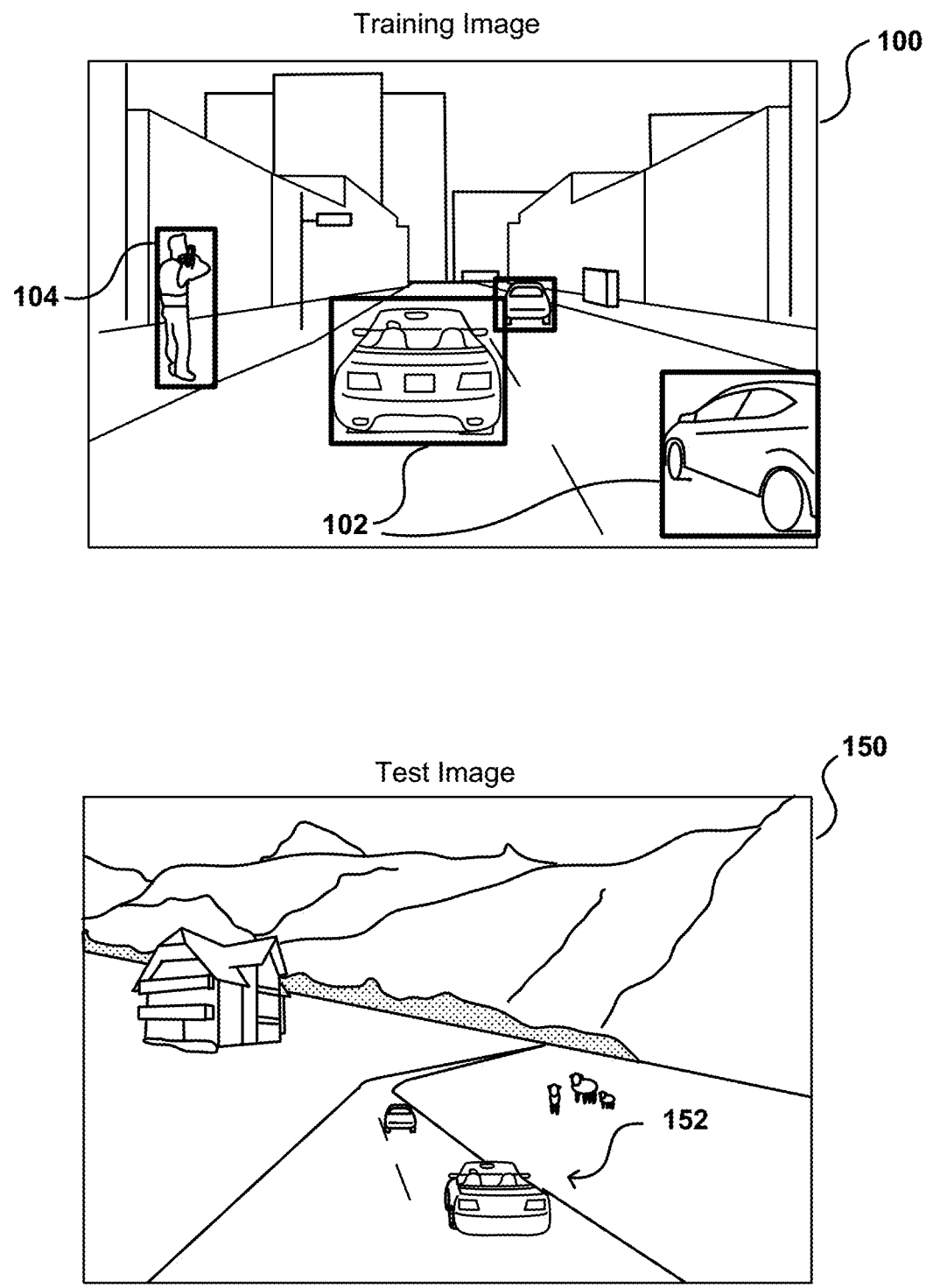
FIG. 1 illustrates images illustrating objects in different domains, according to at least one embodiment.

FIG. 1 illustrates a pair of images including representations of physical objects in two different domains, which can be processed in accordance with various embodiments. A first image 100 can include labels of certain types of objects, such as vehicles 102 and people 104, that are to be recognized from live data at inference time. These labels are associated with position information, such as bounding boxes, that identify a portion of the image in which pixel data for a respective object is located. The image 100, along with the labels and position information, can be used as training data to train one or more neural networks. The labels and position information enable the image to function as a source of ground truth data for the training.

As illustrated, this image may be from a set of similarly labeled images captured from similar scenes or environments. For example, these images may all be captured in urban areas in North America. As such, there may be similar types of objects in the background or elsewhere in the images, as may relate to similar styles of buildings, signs, sidewalks, and so on. A network trained on these images can learn to extract relevant features from images captured in, or generated for, such a domain. It might be the case, however, that the network is desired to be used to analyze images from a different domain that may include different types of objects. FIG. 1 illustrates one such image 150, which may still include objects of one or more types of objects of interest, such as a vehicle 152, that are to be recognized by the network. As illustrated, however, the other objects in this domain may be very different than those in the first domain. Here, instead of an urban setting in North America, the domain may correspond to the hills or Alps of Europe, where there may be objects such as snow-covered mountains, mountain chalets, farm animals that were not represented in the first domain, as well as different versions of certain types of objects, such as different types of signs, roadways, or streetlights. If the second domain corresponds to the British countryside, for example, there may be other differences as well, such as vehicles being located on the opposite sides of the roads. Various other differences may exist as well for images captured in different domains, as well as non-image data or content in various domains, within the scope of the various embodiments.

It may be desirable to use the same network or model to process data for both domains, such as for a vehicle navigation or assistance system installed in a model of vehicle that may be driven in locations associated with either domain. As is the case with domain transfer learning, however, because the training data was only for the first domain in this example, the accuracy of the network will generally not be as good in the second domain for which there was no (or insufficient) labeled training data or ground truth data available.

Figure 2:
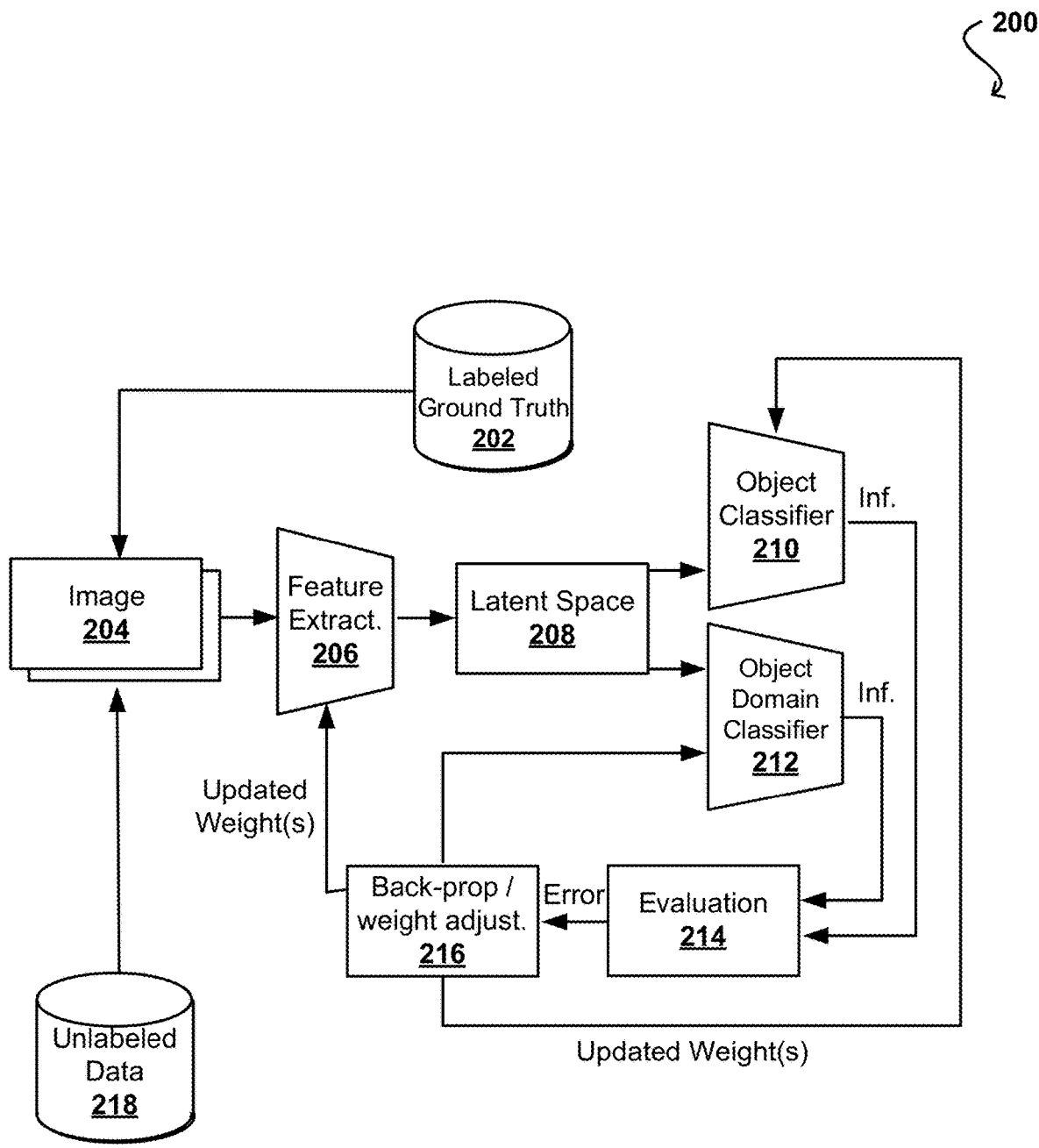
FIG. 2 illustrates components of a system for performing unsupervised domain adaptation-based training of a network, according to at least one embodiment.

Approaches in accordance with various embodiments can provide for unsupervised domain transfer-based learning of neural networks, models, or algorithms, with results that are similar for multiple domains, where sufficient labeled training data was only available for a subset of those domains. FIG. 2 illustrates example components of one such system. In this example, a database 202 of labeled ground truth data can be provided for training, where the labeled training data can correspond to data for at least a first domain. At least a subset of these images can be selected as training images 204 to be used to train one or more neural networks. In some embodiments, a portion of the labeled ground truth data may be retained for testing purposes. In this example, the selected training images 204 are provided as input to a feature extraction network 206. This network can be any appropriate network capable of processing input image data and extracting relevant, representative, or unique image features, such as a convolutional neural network (CNN). In this example, the feature extraction network 206 can encode these features into a latent space 208, while in other embodiments the features may be encoded into a feature vector or latent code, among other such options.

In this example, the latent space 208 can be provided as input to two different classifier networks, such as an object classifier 210 and an object domain classifier 212 (or per-category domain classifier). A per-category domain classifier can be used when there are multiple categories of data, and a specialized domain classifier can be used to determine the appropriate domain per category or object. Other types of networks may be utilized for these or other types of data or tasks as well. In at least one embodiment, each classifier can be a network such as MLP (multi-level perceptron) fully-connected network that operates in the feature space. More powerful classifiers and discriminators could be used as well, but may not be as light weight which might outweigh the benefit of any slight improvement in performance. The object classifier network 210 can analyze the feature data from the latent space and attempt to classify objects of one or more types of interest, or types for which there is labeled training data and which the network is to be trained. For example, the object classifier might analyze the features for an input training image and identify three different vehicles and two people represented in the image. These results can be provided to an evaluation module 214, which can compare the results against the relevant ground truth data to determine any error in the determinations. This error can be provided to another module 216 (or different portion of the same module in some embodiments) to perform tasks such as back-propagation and adjustment of one or more network parameters for the relevant network(s). These adjusted parameters can then be used with the relevant networks during a remainder of the training process. In at least some embodiments, these network parameters can be updated or modified iteratively during the training process until an end criterion is satisfied, such as each relevant network converging, a maximum number of training passes being reached, an end of new training data to be processed, or another such criterion.

In this example, the features of the latent space 208 are also provided as input to a second classifier network, here an object domain classifier 212. An object domain classifier 212 can analyze the feature data to attempt to determine the domain that corresponds to that image, such as the domain corresponding to the environment in which that image data was captured. This may involve distinguishing between two or more specific domains in various embodiments, or may include at least one unknown domain in at least some embodiments. The domain classifier 212 in this example can attempt to determine whether the image data corresponds to the first domain or the second domain. The output determination can also be provided to the evaluation module 214, and error data provided to the second module 216 for updating one or more network parameters as appropriate.

A goal of this training process can be to train the feature extraction network 206 and/or object classifier 210 to perform equally well for data in either the first domain or the second domain. As illustrated, unlabeled training data 218 may be provided for the second domain, and at least some of these images can be selected as training data 204 to be used in training the networks. As with the labeled data in the first domain, the unlabeled data from the second domain will have features extracted and encoded into a latent space 208, with the object classifier network 210 and domain classifier network 212 attempting to identify the objects and domain, respectively. The error in these determinations can be used to update the network parameters for the extraction and classifier networks.

In this example, all three networks are trained together and evaluated using a single loss function that includes terms for each network or task. This approach helps to ensure that the object classifier 210 is able to accurately identify objects from either domain. In order to help ensure that the object classifier 210 performs equally well for both domains, the feature extraction network can be optimized along with the domain classifier on the same data. A goal of such a training process is to train the feature extraction network 206 to extract features that are effectively domain-agnostic, or that otherwise are not specific to a particular domain. In other embodiments, a network may extract domain-relevant features but provide much lower weightings to these features. This might effectively result in training the feature extraction network to extract features that only (or at least primarily) relate to objects of interest, and not features of other objects in the image that might be specific to a particular domain, or to extract only types of features that would not generally be associated with a specific domain. If the feature extraction network 206 is trained to extract such domain-agnostic features, then the domain classifier network 212 should be unable to identify, with any certainty, the domain of a given training image. In an example where the network would output a value of 0 for a first domain or 1 for a second domain, with values in-between representing relative probabilities for either domain, the domain classifier should ideally output a value of 0.5 which means that the domain classifier cannot determine the domain, and that either domain is equally probable. Training the feature extraction network 206 together with the domain classifier 212 in this way helps to train the feature extraction network 206 to extract features that are not domain-specific, or even domain-indicative. Training these together with the object classifier ensures that the features that are extracted also enable the objects to be accurately classified.

Figure 3:
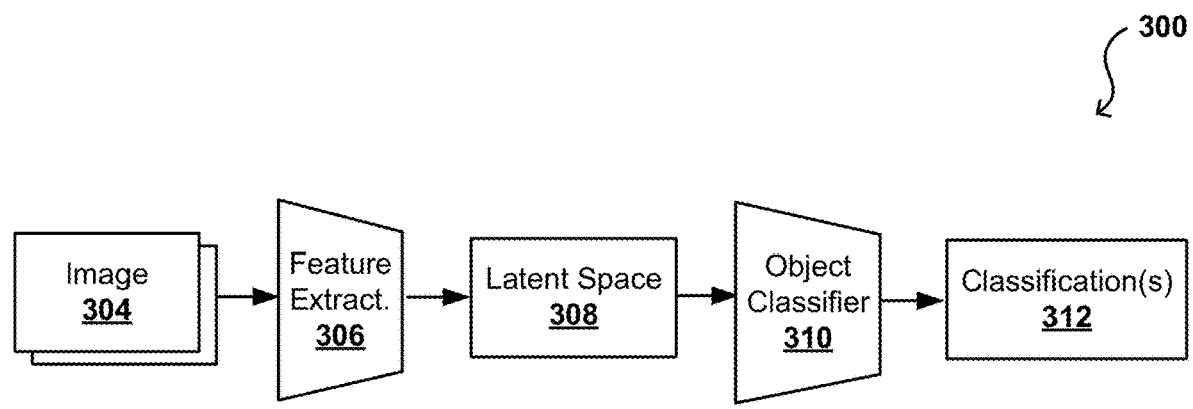
FIG. 3 illustrates components of a data classifier system, according to at least one embodiment.

Once the networks have been sufficiently trained, such as where all networks have converged or the combined loss satisfies a specified loss criterion, at least the extraction and object classification network parameters can be applied to networks of an inferencing pipeline 300 as illustrated in FIG. 3. In this example, input images 304 (or image or video data) can be received at a trained feature extraction network 306, which can extract features and encode those features into a latent space 308. The features extracted can be substantially independent of the domain corresponding to a given input image. The latent space 308 can then be provided as input to a trained object classifier 310, which can infer one or more classifications 312 for objects of interest identified in the input image(s). As mentioned, the accuracy of the inferred classifications should not vary substantially by domain, at least with respect to the domains for which the networks were trained. These classifications (including information such as type of object and location in the image) can then be provided to an application, system, or service that will use this information to perform one or more tasks.

A training process as presented herein enables the feature extraction network to extract features that minimize the impact of the domain. In at least one embodiment, a goal may be that the extracted features correspond only to the objects of interest, and in a way that is completely independent of the domain. Selection of an appropriate loss function for training can help to down-weight the importance that the extraction network pays to the domain, lowering a weighting of any features that do not directly correspond to objects, or classes of objects, of interest. Such an approach can be used to provide for adaptation between a number of different domains that may exhibit various differences. As mentioned, the types of domains may differ by types of content, such as for video, audio, image, data, or other types of content. The domains can correspond to any differences between data sets that may prevent one data set from being properly analyzed by a network that was trained on another data set, as may relate to location, source, object types, styles, appearances, and so on. There may be various differences between data of different domains that can prevent a network trained on data for one domain from accurately inferencing on data of another domain. For an image example, as discussed with respect to FIG. 1, this may relate to different architecture, style, object appearance, object selection, lighting, and other such differences. Different domains can also represent the same types of objects, with similar aspects, but may relate to real data versus synthetic data, or other such differences. Approaches presented with respect to various embodiments herein are general, using lightweight models, and are scalable to be able to handle many, if not all, of these domain differences with high levels of performance. Examples of tasks that can utilize such advantages include, without limitation, natural language processing, navigation or robotics simulations, and data analysis, among many other such examples.

Figure 4:
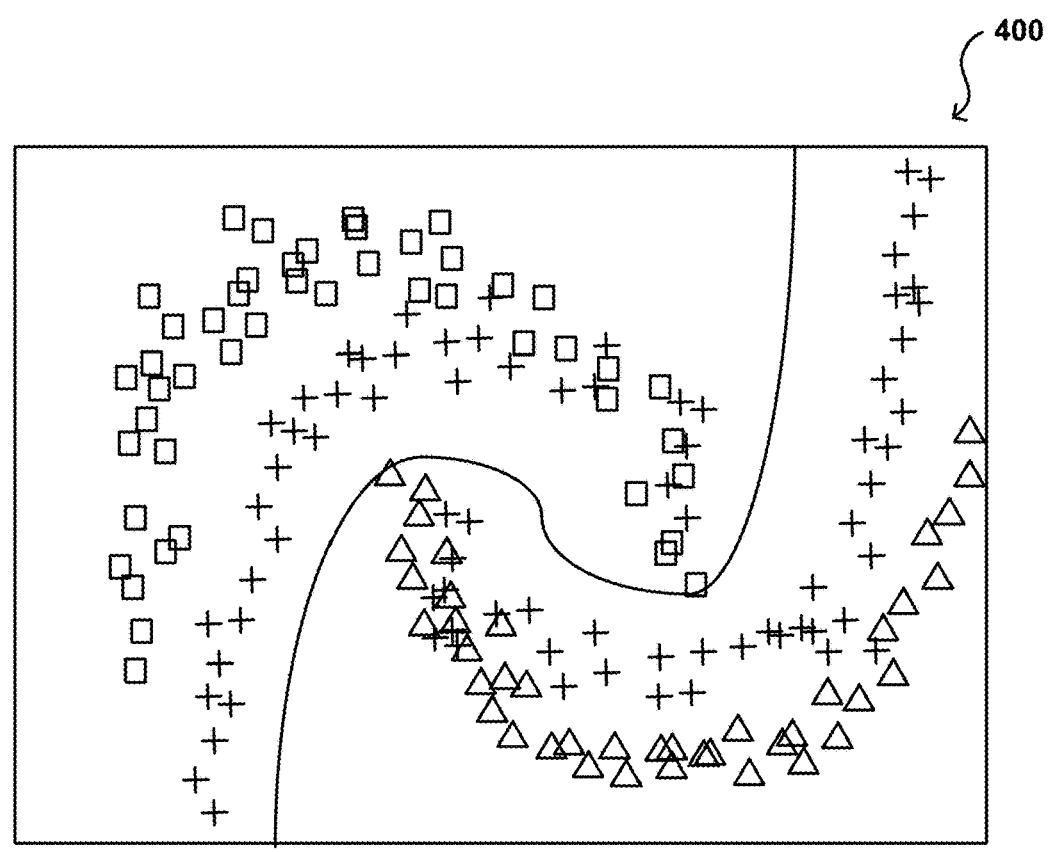
FIG. 4 illustrates a plot of data from multiple domains, according to at least one embodiment.

Approaches in accordance with various embodiments utilize a domain-adversarial framework for domain adaptation that can provide practical learning algorithms for use with neural networks. In at least one embodiment, a generalization bound utilizes a measure of discrepancy between distributions that is based on a variational characterization of f-divergences. Such a bound can support various types of divergences that may occur in practice. A general algorithm is presented for domain-adversarial learning for a complete family of f-divergences. Several f-divergences, including some not considered previously in domain-adversarial learning, have been demonstrated to achieve state-of-the-art results in practice. Various insights can be provided with respect to how the choice of particular divergence affects transfer performance on real-world datasets. By further recognizing the optimization problem as a game, such as a Stackelberg game in at least some embodiments, optimizers from game optimization can be utilized to achieve additional performance boosts in a training algorithm. It has been demonstrated that such an $f$-domain adversarial framework can achieve state-of-the-art results on the challenging datasets (e.g., Office-31 and Office-Home) without use of extra hyperparameters. As can be described with respect to the plot 400 of FIG. 4, domain adaptation can be performed by a learner (e.g., a neural network) that is trained on abundant labeled data, where that learner is also expected to perform well in the target domain (denoted by '+' in the figure). Decision boundaries can correspond to a two-layer neural network, for example, that is trained using an approach such as $f$-DAL as discussed in more detail elsewhere herein.

In at least one embodiment, a framework is utilized that supports the complete family of f-divergences and is practical for modern neural networks. In particular, a measure of discrepancy can be introduced between distributions and its corresponding learning bounds derived. Discrepancy in this instance can be based on a variational characterization of f-divergences and can include both previous theoretical results and practical results. In at least some embodiments, any f-divergence can be used to learn invariant representations, including several divergences that were not considered previously in domain-adversarial learning. From an optimization point of view, a Stackelberg equilibrium can be an optimal solution for a framework under mild conditions in at least one embodiment. Such a solution enables plug-and-play utilization of the min-max optimizers within the framework.

An approach in accordance with at least one embodiment can be discussed with respect to an unsupervised domain adaptation scenario. During training, it can be assumed that the learner has access to a source dataset of $n_s$ labeled examples $S=\{(x_i^s, y_i^s)\}_{i=1}^{n_s}$, and a target dataset of $n_t$ unlabeled examples $T=\{(x_i^t)\}_{i=1}^{n_t}$, where the source inputs $x_i^s$ are sampled independently and identically distributed from a distribution $P_s$ (source distribution) over the input space X, and the target inputs $x_i^t$ are sampled independently and identically distributed from a distribution $P_t$ (target distribution) over X. In the case of binary classification, Y={0, 1} and in a multiclass classification scenario, Y={1, ..., k}.

In at least one embodiment, a labeling function can be denoted as $f: X \rightarrow Y$, and the source and target labeling functions by $f_s$ and $f_t$, respectively. The task of unsupervised domain adaptation is to find a hypothesis function h: $X \rightarrow Y$ that generalizes to the target dataset T (i.e., to make as few errors as possible by comparing with the ground truth label $f_t(x_i^t)$). The risk of a hypothesis h with respect to the labeling function $f$, using a loss function l: $Y \times Y \rightarrow R_+$ under distribution D can be defined as:

$$R_D^l(h, f) := E_{x \sim D}[l(h(x), f(x))]$$

It can also be assumed that l satisfies the triangle inequality. For simplicity of notation, an approach can define:

$$R_S^l(h) := R_{P_s}^l(h, f_s)$$
$$R_T^l(h) := R_{P_T}^l(h, f_t)$$

where the indices S and T refer to the source and target domains, respectively. Additionally, $\hat{R}_S$, $\hat{R}_T$ can be used to refer to empirical risks over the source dataset S and target dataset T.

An important aspect of domain adaptation, at least in some embodiments, involves discrepancies between the source and target distributions. This differentiates transductive approaches, and more generally transfer learning, from traditional supervised learning methods. In at least one embodiment, generalization bounds are derived that capture the entire family of f-divergences. New discrepancies between source and target distributions can be defined, based at least in part upon the variational characterization of various f-divergence choices. These new discrepancies play a fundamental role in our work.

In at least one embodiment, f-divergence can be defined by letting $P_s$ and $P_t$ represent distribution functions with densities $p_s$ and $p_t$, respectively. This approach can let $p_s$ and $p_t$ be absolute continuous values with respect to a base measure dx. Let $\varphi: R_+ \rightarrow R$ be a convex, lower semi-continuous function that satisfies $\varphi(1)=0$. The f-divergence $D_\varphi$ can be defined as:

$$D_\varphi(P_s \| P_t) = \int p_t(x) \varphi\left(\frac{p_s(x)}{p_t(x)}\right) dx$$

As far as variational characterization of f-divergences, a general variational method can be utilized that estimates f-divergences from samples by turning the estimation problem into variational optimization. In one example, any f-divergence can be written as:

$$D_\varphi(P_s \| P_t) \geq \sup_{T \in \mathcal{T}} E_{x \sim P_s}[T(x)] - E_{x \sim P_t}[\varphi^*(T(x))]$$

where $\varphi^*$ is the (Fenchel) conjugate function of $\varphi: R_+ \rightarrow R$ defined as $\varphi^*(y) := \sup_{x \in R_+} \{xy - \varphi(x)\}$, and T: $X \rightarrow$ dom $\varphi^*$. The equality holds if T is the set of all measurable functions. Many popular divergences that are heavily used in machine learning and information theory are special cases of f-divergences. For simplicity, it can be assumed that $X \subseteq R^n$ and each density (e.g., $p_s$ and $p_t$) is absolutely continuous.

Domain adaptation approaches generally build upon the idea of bounding the gap between the error functions for the source and target domains in terms of the discrepancy between their probability distributions. Measuring the similarity between the distributions $P_s$ and $P_t$ can be important in the derivation of generalization bounds and/or the design of algorithms. In at least one embodiment, risk of any binary classifier in the hypothesis class H can be bounded using the following theorem:

Theorem 1. If $l(x, y)=|h(x)-y|$ and H is a class of functions, then for any $h \in H$:

$$R_T^l(h) \leq R_S^l(h) + D_{TV}(P_s \| P_t) + \min\{E_{x \sim P_s}[|f_t(x) - f_s(x)|],$$

$$E_{x \sim P_t}[|f_t(x) - f_s(x)|]\}$$

Here, $D_{TV}(P_s \| P_t) := \sup_{T \in \mathcal{T}} |E_{x \sim P_s}[T(x)] - E_{x \sim P_t}[T(x)]|$ is the TV and T is the set of measurable functions. TV is an f-divergence such that $\varphi(x)=|x-1|$ above. For any function $\varphi(x) \geq |x-1|$, one can replace $D_{TV}(P_s \| P_t)$ in the above equation with $D_\varphi(P_s \| P_t)$. The theorem above bounds the target error of a classifier in terms of the source error, the divergence between the two domains, and the dissimilarity of the labeling functions. Unfortunately, $D_{TV}(P_s \| P_t)$ cannot be estimated from finite samples of arbitrary distributions. It is also a very loose upper bound as it involves the supremum over all measurable functions and does not account for the hypothesis class.

In at least one embodiment, a new discrepancy can be utilized that can be used to solve at least two aforementioned problems, namely (1) estimation of the divergence from finite samples of arbitrary distributions and (2) restriction of the discrepancy to the set including the hypothesis class H. A second definition can be provided for discrepancy, as may be given by:

Let $\varphi^*$ be the Fenchel conjugate of a convex, lower semi-continuous function $\varphi$ that satisfies $\varphi(1)=0$, and let $\hat{\mathcal{T}}$ be a set of measurable functions such that:

$$\hat{\mathcal{T}} = \{l(h(x) m h'(x)) : h, h' \in H\}$$

The discrepancy between $P_s$ and $P_t$ can then be defined as:

$$D_H^\varphi(P_s \| P_t) := \sup_{h, h' \in H} \left| E_{x \sim P_s}[l(h(x), h'(x))] - E_{x \sim P_t}[\varphi^*(l(h(x), h'(x)))] \right|$$

The $D_H^\varphi$ discrepancy can be interpreted as a lower bound estimator of a general class of f-divergences. Therefore, for any hypothesis class H and choice of $\varphi$, $D_H^\varphi$ is never larger than its corresponding f-divergence. Its computation can be bounded in terms of finite examples. Further, the H$\Delta$H divergence can be recovered if considering $\varphi^*(t)=t$, and $l(h(x), h'(x))=1(h(x) \neq h'(x))$, which corresponds to the TV.

A third definition for discrepancy can be provided, as may be given by:

Supposing the same conditions as above, the discrepancy between two distributions $P_s$ and $P_t$ is defined by:

$$D_{h,H}^\varphi(P_s \| P_t) := \sup_{h' \in H} \left| E_{x \sim P_s}[l(h(x), h'(x))] - E_{x \sim P_t}[\varphi^*(l(h(x), h'(x)))] \right|$$

Taking the supremum of $D_{h,H}^\varphi$ over $h \in H$, can obtain $D_H^\varphi$, and thus $D_{h,H}^\varphi(P_s\|P_t) \leq D_H^\varphi(P_s\|P_t)$. This bound will be useful when deriving practical algorithms. As a lower bound (Lemma 1), for any two functions h, h' in H:

$$\left|D_{h,H}^\varphi(P_s\|P_t) - D_{h,H}^\varphi(S\|T)\right| \leq 2\mathfrak{R}_{P_s}(l \circ H) + 2\sqrt{-\log \delta/(2n)}$$

Lemma 1 can be fundamental in the derivation of divergence-based generalization bounds. Specifically, it bounds the gap between error functions for the source and target domains in terms of the discrepancy between their distributions using f-divergences. It can also be shown that $D_{h,H}^\varphi$ can be estimated from finite samples. For Lemma 2, Suppose l: Y×Y→[0, 1], $\varphi^*$ L-Lipschitz, and $[0, 1] \subset \text{-dom } \varphi^*$. Let S and T be two empirical distributions corresponding to datasets containing n datapoints sampled independently and identically distributed from $P_s$ and $P_t$, respectively. Let R represent the Rademacher complexity of a given class of functions, and $(l \circ H) = \{x \to l(h(x), h'(x)): h, h' \in H\}$. $\forall \delta \in (0, 1)$, there is then with probability of at least 1−δ:

$$\left|D_{h,H}^\varphi(P_s\|P_t) - D_{h,H}^\varphi(S\|T)\right| \leq 2\mathfrak{R}_{P_s}(l \circ H) + 2\mathfrak{R}_{P_t}(l \circ H) + 2\sqrt{-\log \delta/(2n)}$$

In Lemma 2, it is shown that the empirical $D_{h,H}^\varphi$ converges to the true $D_H^\varphi$ discrepancy. It can then be estimated using a set of finite samples from the two distributions. The gap is bounded by the complexity of the hypothesis class and the number of examples (n).

In at least one embodiment, a generalization bound can be utilized to estimate the error of a classifier in the target domain using the proposed $D_H^\varphi$ divergence and results from the previous section. A generalization Rademacher complexity bound can also be used for a binary classifier based on the estimation of the $D_{h,H}^\varphi$ from finite samples. It can be shown that the bound generalizes previous existing results.

For Theorem 2 (generalization bound), suppose l: Y×Y→ [0, 1] ⊂ dom $\varphi^*$ and that $l(a, b) \leq l(a, c) + l(c, b)$ for any a, b, c∈Y. Denote $\lambda^* = R_S^l(h^*) + R_T^l(h^*)$, and let $h^*$ be the ideal joint hypothesis. This then leads to:

$$R_T^l(h) \leq R_S^l(h) + D_{h,H}^\varphi(P_s\|P_t) + \lambda^*$$

The three terms in this upper bound share similarity with the bounds with prior proposals, with a significant different being the discrepancy used to compare the two marginal distributions. In at least one embodiment, this utilizes a reduction of a lower bound estimator of a variational characterization of the general f-divergences. This generalizes and includes popular divergences typically used in practice. Intuitively, the first term in the bound accounts for the source error, the second corresponds to the discrepancy between the marginal distributions, and the third measures the ideal joint hypothesis ($\lambda^*$). If H is expressive enough and the labeling functions are similar, this last term could be reduced to a small value. The ideal joint hypothesis incorporates the notion of adaptability: when the optimal hypothesis performs poorly in either domain, we cannot expect successful adaptation.

For theorem 3 (generalization bound with Rademacher complexity), let l: Y×Y→[0, 1]$\varphi^*$ be L-Lipschitz. Let S and T be two empirical distributions (i.e., datasets containing n data points sampled independent and identically distributed from $P_s$ and Pr, respectively). Denoting $\hat{\lambda}^*_\varphi := \hat{R}_S^l(h^*) + \hat{R}_T^l(h^*)$. $\forall \delta \in (0, 1)$, there is then with probability of at least 1-δ:

$$R_T^l(h) \leq \hat{R}_S^l(h) + D_{h,H}^\varphi(S\|T) + \hat{\lambda}^*_\varphi + 6\mathfrak{R}_s(l \circ H) + 2(1+L)\mathfrak{R}_T(l \circ H) +$$
$$5\sqrt{(-\log \delta)/2n}$$

In Theorem 3, computation of the generalization bound is shown for a binary classifier in terms of the Rademacher complexity of the class H. It can be seen that under the assumption of an ideal joint hypothesis $\hat{\lambda}^*_\varphi$, the generalization error can be reduced by jointly minimizing the risk in the source domain, the discrepancy between the two distributions, and regularizing the model to limit the complexity of the hypothesis class.

The previously-presented theory can be used to derive a generalized domain adversarial learning framework. An important aspect of domain-adversarial training is to simultaneously minimize the source error and align the two distributions in a representation space Z. Specifically, hypothesis h can be the composition of h=ĥ∘g (i.e., let H := {ĥ∘g: ĥ∈Ĥ, g∈G} with Ĥ another function class) where g: X→Z. This can be interpreted as a mapping that pushes forward the two densities $p_s$ and $p_t$ to a representation space Z where a classifier h∈Ĥ operates. Consequently, reference can be made to $p_s^z := g \#p_s$ and $p_t^z := g \#p_t$ as the push-forwards of the source and target domain densities, respectively. An example of such a framework is illustrated in FIG. 2, discussed above.

In at least one embodiment, for adaptation to be possible in representation space Z, there has to be an h∈Ĥ such that the ideal joint risk $\lambda^*$ is negligible. This condition may be present even if $p_s^z = p_t^z$. In other words, the difference between $p_s^z$ and $p_t^z$ should be small, and the ideal joint risk $\lambda^*$ should be negligible. These are both sufficient and necessary conditions in at least some embodiments. A first assumption can be made, in that there is a g∈G and ĥ∈Ĥ, such that the ideal joint risk ($\lambda^*$) is negligible. It can also be assumed that the class-conditional distributions between source and target are similar. Neural networks are able to learn rich and powerful representations, and in practical scenarios, g and h are both neural networks.

From Theorem 2 and the first assumption, the target risk $R_T^l(h)$ can be optimized by jointly minimizing the error in the source domain and the discrepancy between the two distributions. Letting $y := f_s(x)$, an optimization objective can be written as:

$$\min_{\hat{h} \in \hat{H}} E_{z \sim p_s^z}[l(\hat{h}(z), y)] + D_{\hat{h} \in \hat{H}}^\varphi(p_s^z, p_t^z)$$

Here, l is a surrogate loss function used to minimize the empirical risk in the source domain. Nonetheless, it does not have to be the binary classification loss (i.e., it can be the cross-entropy loss). Under some assumptions (e.g., Proposition 1) and the use of Lemma 1, the minimization problem above can be upper bounded (i.e., replaced) by the following min-max objective:

$$\min_{\hat{h} \in \hat{H}} \max_{\hat{h}' \in \hat{H}} E_{z \sim p_s^z}[l(\hat{h}(z), y)] + \underline{E_{z \sim p_s^z}[l(\hat{h}'(z), \hat{h}(z))] - E_{z \sim p_t^z}[(\varphi^* \circ l)(\hat{h}'(z), \hat{h}(z))]}$$

where the difference between the last two terms can be referred to as $d_{s,t}$. This result can now be formalized in proposition 1. Suppose $d_{s,t}$ takes the form shown above with $\hat{l}(\hat{h}'(z), \hat{h}(z)) \to \text{dom } \varphi^*$ and that for any $\hat{h} \in \hat{H}$, there exists $\hat{h}' \in \hat{H}$ such that $$\hat{l}(\hat{h}'(z), \hat{h}(z)) = \varphi'\left(\frac{p_s^z(z)}{p_t^z(z)}\right)$$

for any $z \in \text{supp}(p_t^z(z))$, with $\varphi'$ the derivative of $\varphi$. The optimal $d_{s,t}$ is at least one embodiment is then given by $$D_\varphi(P_s^z \| P_c^z) \text{ (i.e., } \max_{\hat{h}' \in \hat{H}} d_{s,t} = D_\varphi(P_s^z \| P_t^z)).$$

If feature extractor $g \in G$ is allowed to be the one that minimizes both the source error and the discrepancy term, the corresponding equation can be rewritten as:

$$\min_{\hat{h} \in \hat{H}, g \in G} \max_{\hat{h}' \in \hat{H}} E_{z \sim p_s}[l(\hat{h} \circ g, y)] +$$

$$\underline{E_{z \sim p_s}[\hat{l}(\hat{h} \circ g, \hat{h} \circ g)] - E_{z \sim p_t}[(\varphi^* \circ \hat{l})(\hat{h}' \circ g, \hat{h} \circ g)]}$$

The choice of $\hat{l}$ can be somewhat arbitrary for GANs. For the multiclass scenario, let $\hat{l}(a, b) = g(b_{\text{argmax } a})$, where argmax a is the index of the largest element of vector a. The binary case can utilize $\hat{l}(\_, b) = g(b)$, which implies selection of the domain of $\hat{l}$ to be $\mathbb{R}^k \times \mathbb{R}^k$ with k categories for the multiclass scenario and $\mathbb{R}$ for binary classification. Intuitively, $\hat{h}'$ is an auxiliary per-category domain classifier. For the choice of g, it can be chosen to be a monotonically increasing function when possible.

As mentioned, one significant objective of such a framework can be a minimax optimization problem with a desired (i.e., optimal) solution that, under mild assumptions, can be a Stackelberg equilibrium. Such an observation enables incorporation into the framework various state of the art optimizers, such as those used for game-optimization. Following from this, the extra-gradient algorithm and its aggressive version can be used within an unsupervised domain adaptation framework.

In at least one embodiment, the existence of Stackelberg equilibria can be demonstrated in $f$-Domain Adversarial Learning ($f$-DAL). Let G and A be a class of functions defined by a fixed parametric functional, such as neural networks with a fixed architecture, and define $\omega_1$ such that is a vector composed of the parameters of the feature extractor g and the source classifier h. Similarly, let $\Omega_2$ represent the parameters of the auxiliary classifier, $\hat{h}'$, and $\Omega_1$ and $\Omega_2$ denote their separate domains. The corresponding equation above can then be rewritten as:

$$\min_{\omega_1 \in \Omega_1} \max_{\omega_2 \in \Omega_2} V(\omega_1, \omega_2)$$

In general, V is nonconvex in $\omega_1$ and nonconcave in $\omega_2$, and for the min-max game Nash equilibria may not exist. A Stackelberg equilibrium is more general than Nash equilibrium and reflects the sequential nature of the zero-sum game equation presented above. It can be shown that an optimal solution of $f$-DAL in at least one embodiment is a Stackelberg equilibrium. Such an equilibrium is a stationary point under the assumption that V ($\omega_1$,) is (locally) strongly concave in $\omega_2$, and gradient algorithms can then be used to search for such a desirable solution. In the following theorem, the explicit form of push-forward can be used to emphasize the dependence on the feature extractor g, rather than pes, por.

For theorem 4 (Stackelberg equilibrium, informal), Suppose $d_{s,t}$ takes the form above, and assume that there exists an optimal $g^* \in G$ that maps both the source and the target distribution to the same distribution. Assume also that there exists an optimal classifier that yields the ground truth in a neighborhood, and that for any $g \in G$ and $\hat{h} \in H$, there exists $\hat{h}'$ that achieves $\hat{l}(\hat{h}'(z), \hat{h}(z)) = \varphi'((g \#p_s)(z)/(g \#p_t)(z))$. The objective of $f$-adversarial learning can then have a Stackelberg equilibrium at $(\hat{h}^*, g^*, \hat{h}')$. When $l(\hat{h}, \hat{h}') = l(\hat{h}')$ (e.g., in a binary classification scenario), the Stackelberg equilibrium can be shown to be a Nash equilibrium.

As discussed, in at least one embodiment the optimal solution in $f$-DAL is a Stackelberg equilibrium, which is more general than a Nash equilibrium. For convergence to a Nash equilibrium, the simplest method can be GDA, but the last iterate of GDA does not converge in the bilinear case. To accelerate and stabilize the convergence, an extra-gradient (EG) method can be used. Having an aggressive extra step can be even more stable than a general form of EG, and can be more suitable for convergence to Stackelberg equilibria. With an aim of quantifying whether exploiting Theorem 4 leads to practical gains, the extrapolation step can be allowed to be larger, with this algorithm being referred to herein as Aggressive Extra-Gradient (AExG).

In at least one embodiment, such an algorithm can be implemented in PyTorch, using ResNet-50 pretrained on ImageNet as a feature extractor. The main classifier ($\hat{h}$) and auxiliary classifier ($\hat{h}'$) (e.g., an object classifier and domain classifier) can both be two-layer neural networks with Leaky-Relu activation functions. Spectral normalization (SN) can be used for the main and auxiliary classifiers. No significant transfer learning improvement was determined by using Leaky-Relu activation functions instead of Relu. One reason for this was to avoid gradient issues and instabilities during training for some divergences in the first epochs. For simplicity, and fair comparison with previous work, simultaneous updates can be performed. For optimization, an example experiment utilized mini-batch (32) SGD (or GDA) with the Nesterov momentum. For experiments using AExG, a version of the ExtraGradient can be implemented with momentum (0.9). For an aggressive step, a multiplier [10, 1] can be used with a polynomial decay rate with power=0.5 for the first 10K iterations. In all cases, the learning rate of the classifiers was set 10 times larger than the one of the feature extractor (0.01) whose value is adjusted accordingly.

Such an approach provides a novel perspective on the domain-adversarial problem by deriving new theory and learning algorithms that support the complete family of f-divergences, and that are practical for modern neural networks. The learning objective of such a framework can be realized as a Stackelberg game, using optimizers such as those used for game-optimization, achieving additional performance boosts. It was shown through large-scale experiments that any f-divergence can be used to minimize the discrepancy between source and target domains in a representation space. It was also shown that some divergences, not considered previously in domain-adversarial learning, achieve results in practice that are at least as good as other state of the art methods, reducing the need for additional techniques and hyperparameter tuning as required by these existing methods.

Figure 5A:
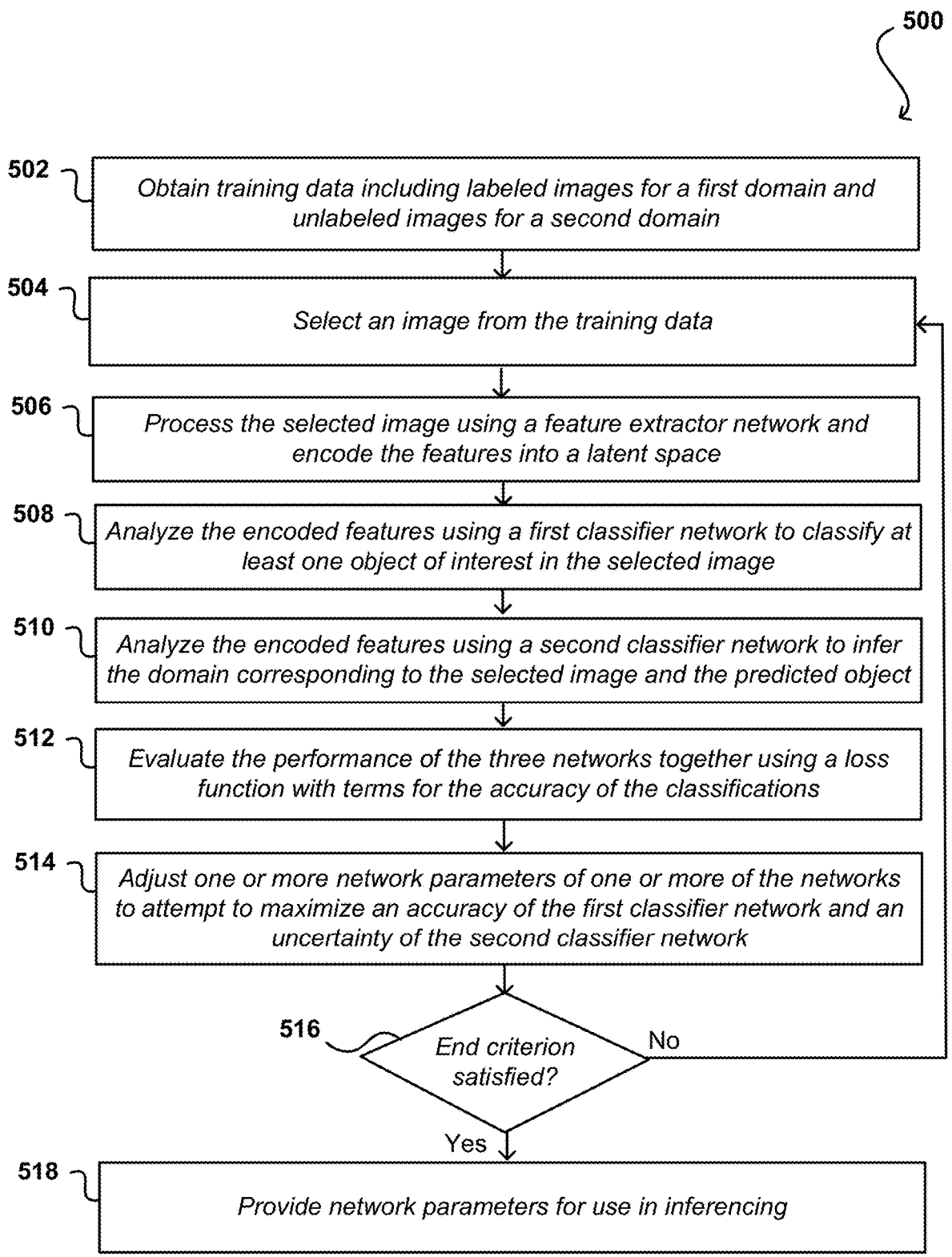
FIGS. 5A, 5B, and 5C illustrate processes for training neural networks and using those neural networks for inferencing, according to at least one embodiment.

FIG. 5A illustrates an example process 500 for performing unsupervised domain transfer training that can be utilized in accordance with various embodiments. It should be understood that for this and other processes presented herein that there can be additional, fewer, or alternative steps performed in similar or alternative orders, or at least partially in parallel, within the scope of the various embodiments unless otherwise specifically stated. Further, while image data is used as an example it should be understood that other types of data can be used with such a process as well, as discussed and suggested elsewhere herein. In this example, a set of training data is obtained 502, or generated, that includes labeled images for a first domain and unlabeled images for a second domain. There may be images from more than one domain in other examples. In this example, an image is selected 504 from the training data, where that image can correspond to a labeled image from the first domain or an unlabeled image from the second domain. In some embodiments, an amount of pre-processing may be performed, such as to adjust a size, resolution, color depth, format, noise level, or other aspect of the image. The selected image can be processed 506 using a feature extractor network, and features extracted from the image can be encoded into a latent space. In at least one embodiment, these features should primarily correspond to one or more objects of specific classifications or types of interest represented in the image. The encoded features can be analyzed 508 using a first classifier network to classify at least one object of interest in the selected image. The encoded features can also be analyzed 510, potentially in parallel, using a second classifier network to infer the domain corresponding to the selected image and predicted object. The performance of the three networks can then be evaluated 512 using a loss function that at least includes terms relating to the accuracy of the object and domain classifications. Based at least in part upon a loss value determined using this loss function, one or more network parameters (or network weights) of one or more of the feature extraction or classifier networks can be adjusted 514 to attempt to at least maximize an accuracy of the first classifier network, or an accuracy of the object classifications, as well as the uncertainty of the second classifier network, such that the second network is unable to identify, with any reasonable certainty, the domain of the selected image. In at least one embodiment, this corresponds to a result where the second classifier network infers that it is equally probable that the image corresponds to any of a set of domains for which the networks are being trained. Once any adjustment to the network parameters is made, a determination can be made 516 as to whether at least one end criterion has been satisfied, such as the networks satisfying a convergence criterion, a maximum number of training passes being reached, or all training data having been processed, among other such options. If not, then the process can continue with a next selected training image. If at least one training end criterion is satisfied, then the network parameters for at least one of the feature extraction network or the first classification network can be provided 518 for use in inferencing.

Figure 5B:
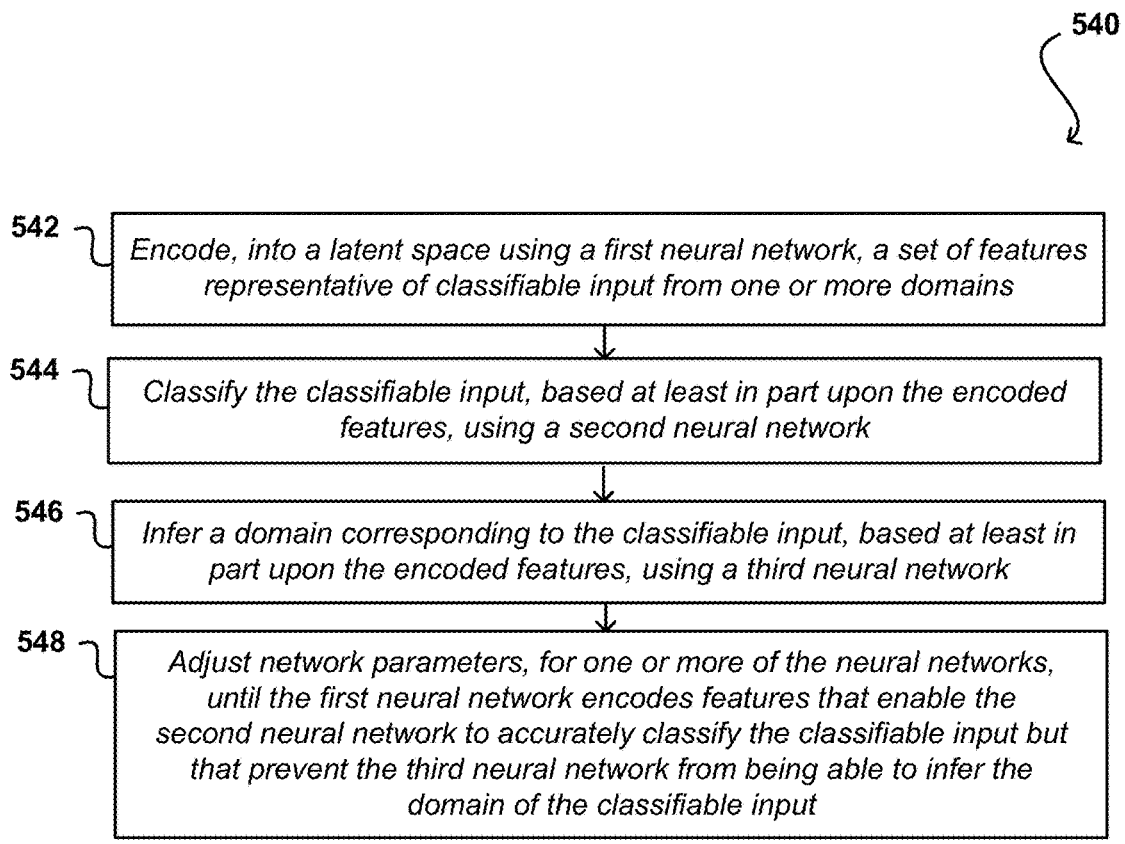

FIG. 5B illustrates another example training process 540 that can be utilized in accordance with various embodiments. In this example, a set of features representative of classifiable input is encoded 542 into a latent space, where the extraction and encoding is performed using a first neural network. The input can then be classified 544, based at least in part upon the encoded features, using a second neural network. In at least one embodiment, this can involve classifying one or more objects or instances in the classifiable input. A domain corresponding to the classifiable input can also be inferred 546, based at least in part upon the encoded features, using a third neural network. One or more network parameters can then be adjusted 548 for one or more of the neural networks until the first neural network encodes features that enable the second neural network to accurately classify the classifiable input but that prevent the third neural network from being able to infer the domain of the classifiable input. Such a result means that data can be accurately classified independent of which of the domains is associated with that data. This can occur even when training data from one of the domains is unlabeled, or at least insufficiently labeled to provide accurate domain-specific training. The network parameters for at least the first or second neural networks can then be provided for use in inferencing for one or more tasks involving data from the one or more domains.

Figure 5C:
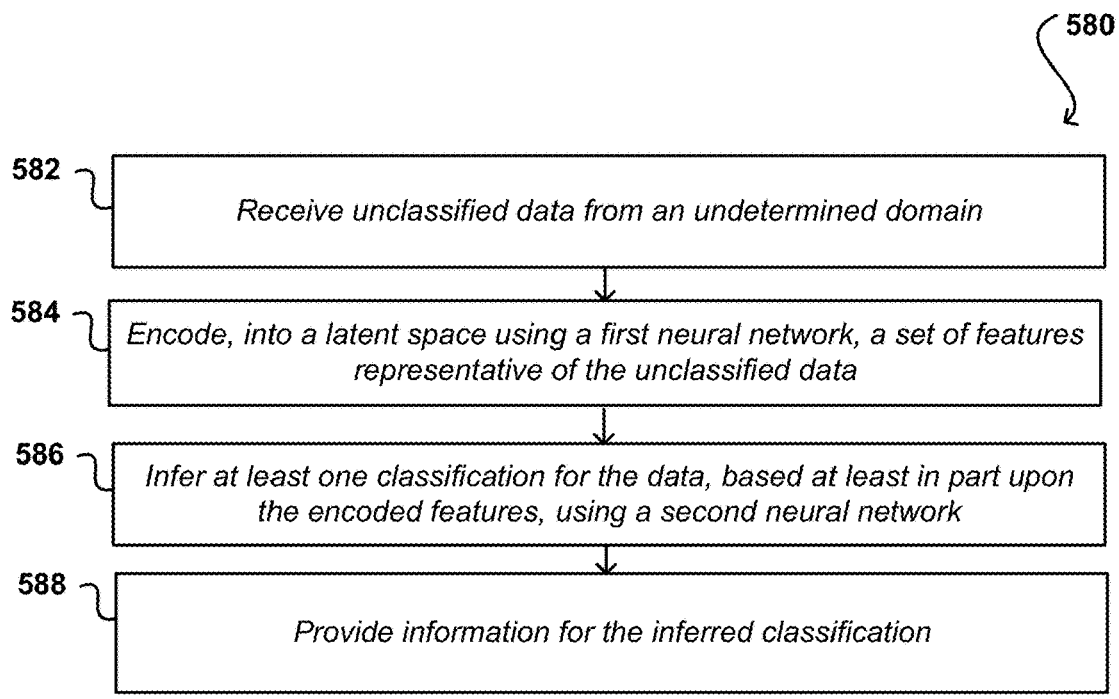

FIG. 5C illustrates an example process 580 for classifying data using networks trained using a process such as those discussed with respect to FIG. 5A or FIG. 5B. In this example, unclassified data is received 582 that is from an undetermined domain, at least from within a set of possible domains. A set of features representative of the unclassified data can be extracted and encoded 584 into a latent space using a first neural network. At least one classification for the data can be inferred 586, based at least in part upon the encoded features, using a second neural network. Information about the inferred classification can be provided 588 to an intended recipient or location, such as may be utilized as part of a task that relies upon the classifications of the data.

Figure 6:
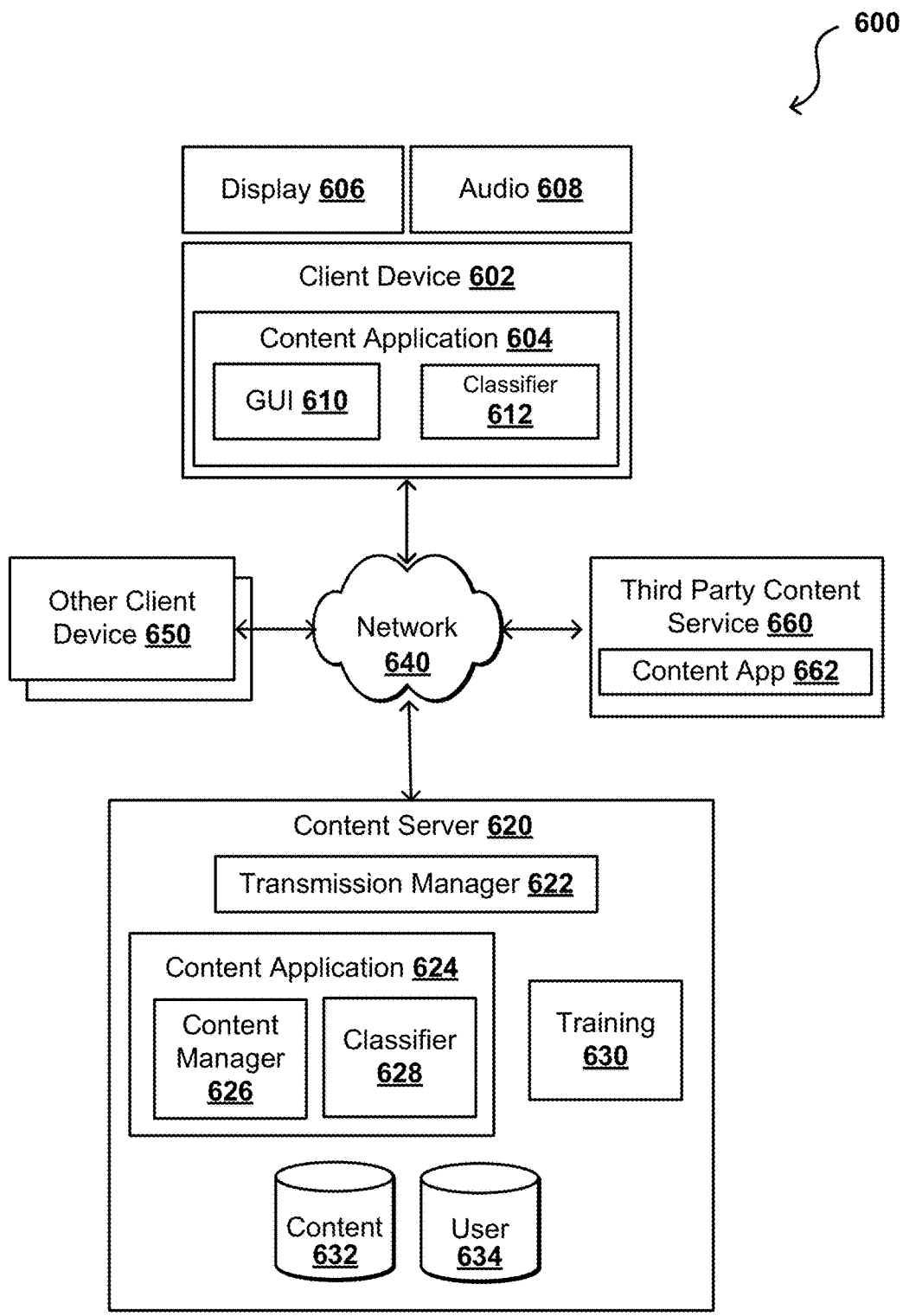
FIG. 6 illustrates components of a system for performing training and/or inferencing, according to at least one embodiment.

As an example, FIG. 6 illustrates an example network configuration 600 that can be used to provide or generate content or other such data. In at least one embodiment, a client device 602 can generate content for a session using components of a content application 604 on client device 602 and data stored locally on that client device. In at least one embodiment, a content application 624 (e.g., an image generation, editing, or analysis application) executing on content server 620 (e.g., a cloud server or edge server) may initiate a session associated with at least client device 602, as may utilize a session manager and user data stored in a user database 634, and can cause content 632 to be determined by a content manager 626 and transmitted to client device 602 using an appropriate transmission manager 622 to send by download, streaming, or another such transmission channel. The content server 620 can also include one or more training modules 630 for training a component, network, or pipeline. The server 620 may include a classifier component 628 for classifying or running other inferences on input data, and providing those inferences, or content generated from those instances. In at least one embodiment, client device 602 receiving this content can provide this content to a corresponding content application 604, which provide at least some of this content for presentation via client device 602, such as image or video content through a display 606 and audio, such as sounds and music, through at least one audio playback device 608, such as speakers or headphones.

In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or content database 634, to client device 602. In at least one embodiment, at least a portion of this content can be obtained or streamed from another source, such as a third party content service 660 that may also include a content application 662 for generating or providing content. In at least one embodiment, portions of this functionality can be performed using multiple computing devices, or multiple processors within one or more computing devices, such as may include a combination of CPUs and GPUs.

In at least one embodiment, content application 624 includes a content manager 626 that can determine or analyze content before this content is transmitted to client device 602. In at least one embodiment, content manager 626 can also include, or work with, other components that are able to generate, modify, or enhance content to be provided. In at least one embodiment, this can include a rendering engine for rendering image or video content. In at least one embodiment, a classifier component 628 can be used to infer classifications, which can be used by the content application 624 on the server or the content application 604 on the client device to generate relevant content or perform an intended task. In at least one embodiment, a training component 630 can be used to train the classifier network, as well as any related networks or algorithms, using processes such as those presented herein. In at least one embodiment, content manager 626 can cause generated content to be transmitted to client device 602. In at least one embodiment, a content application 604 on client device 602 may also include components such as a classifier component 612, or content generation module, such that any or all of this functionality can additionally, or alternatively, be performed on client device 602. In at least one embodiment, a content application 662 on a third party content service system 660 can also include such functionality. In at least one embodiment, locations where at least some of this functionality is performed may be configurable, or may depend upon factors such as a type of client device 602 or availability of a network connection with appropriate bandwidth, among other such factors. In at least one embodiment, a system for content generation can include any appropriate combination of hardware and software in one or more locations. In at least one embodiment, generated image or video content of one or more resolutions can also be provided, or made available, to other client devices 650, such as for download or streaming from a media source storing a copy of that image or video content. In at least one embodiment, this may include transmitting images of game content for a multiplayer game, where different client devices may display that content at different resolutions, including one or more super-resolutions.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
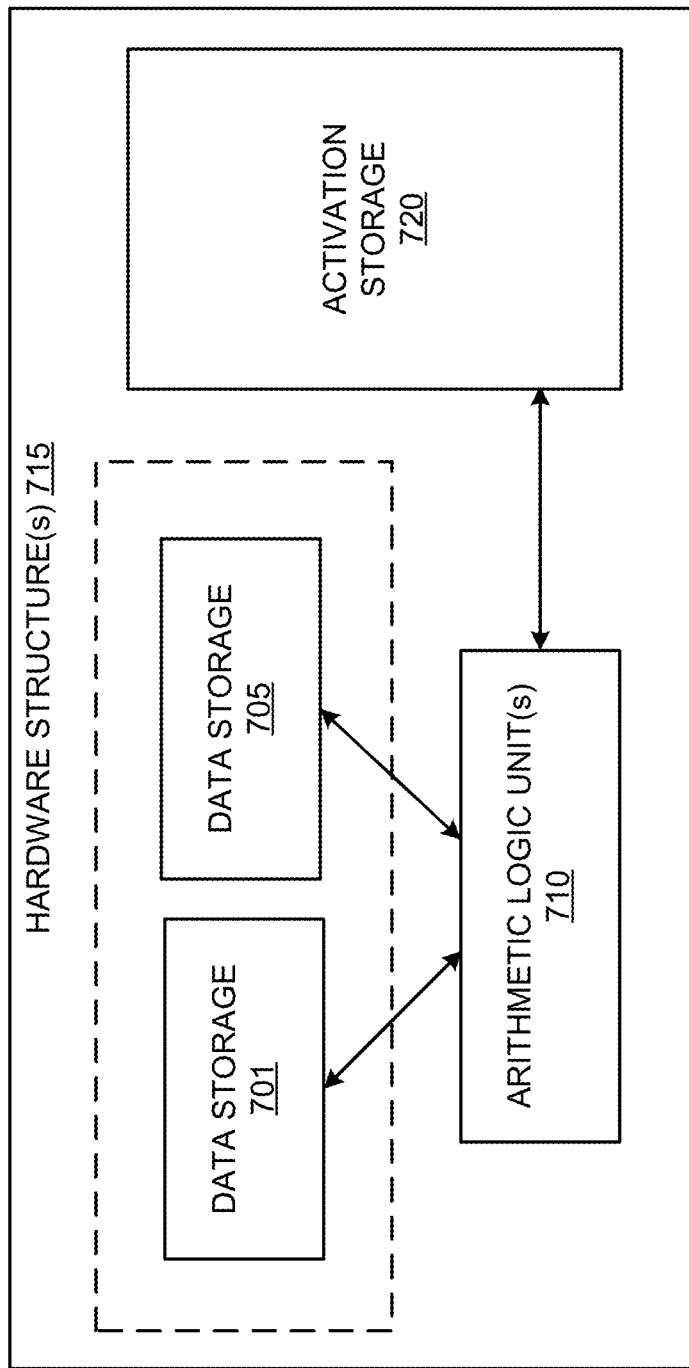
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
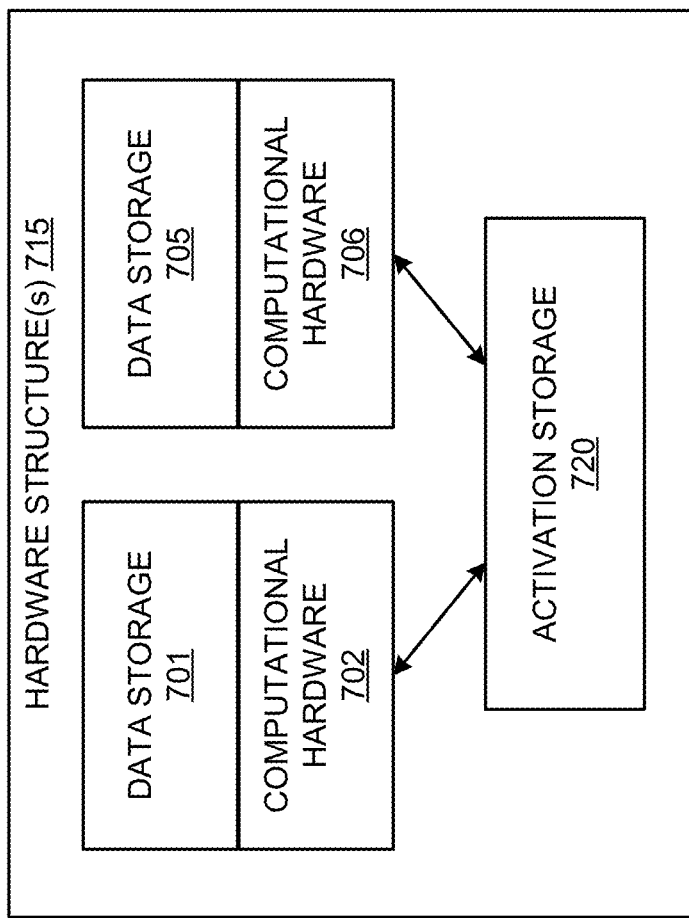
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
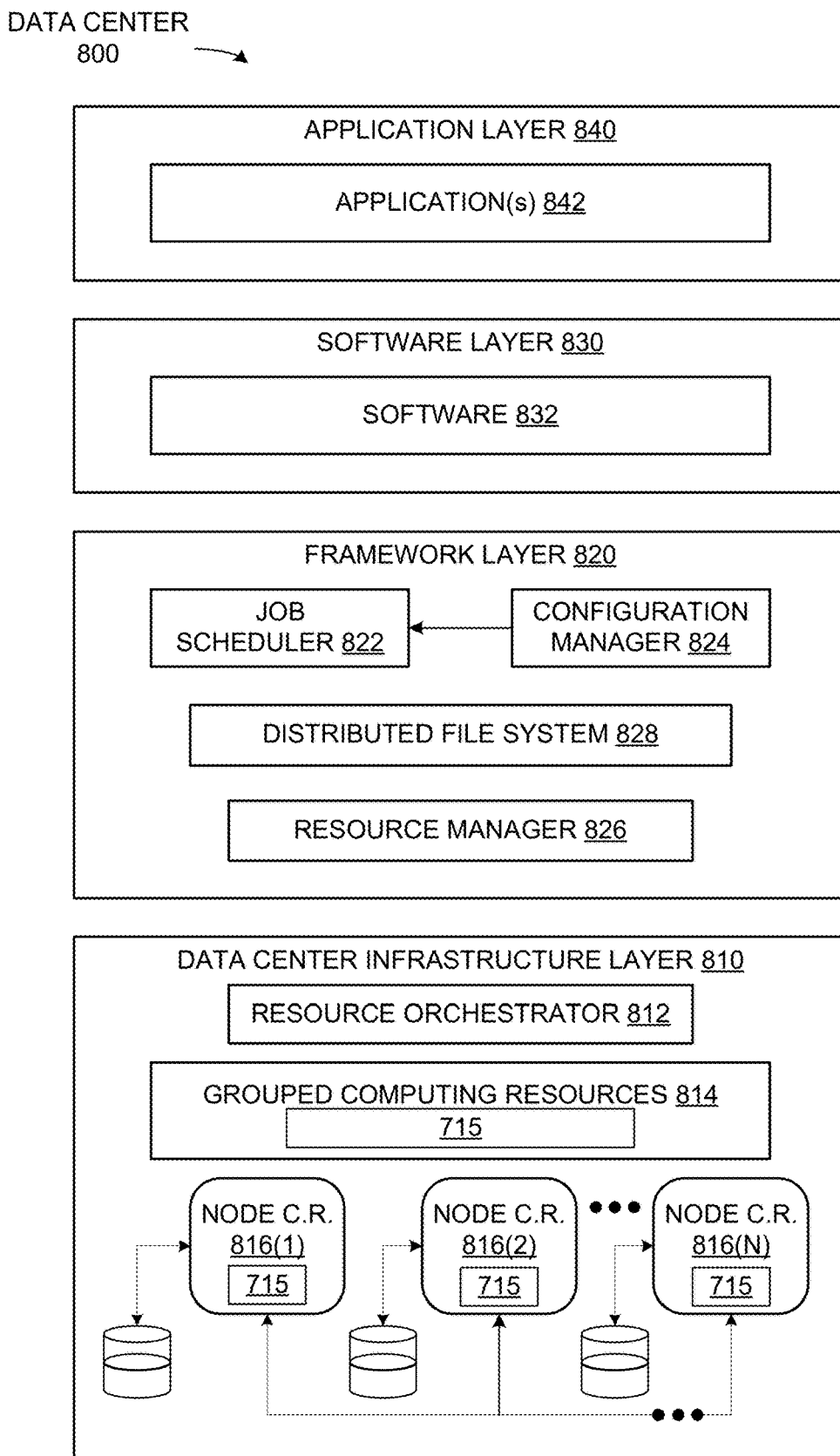
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to perform unsupervised domain transfer for one or more neural networks, as may include a feature extraction network and a classifier network.

Computer Systems

Figure 9:
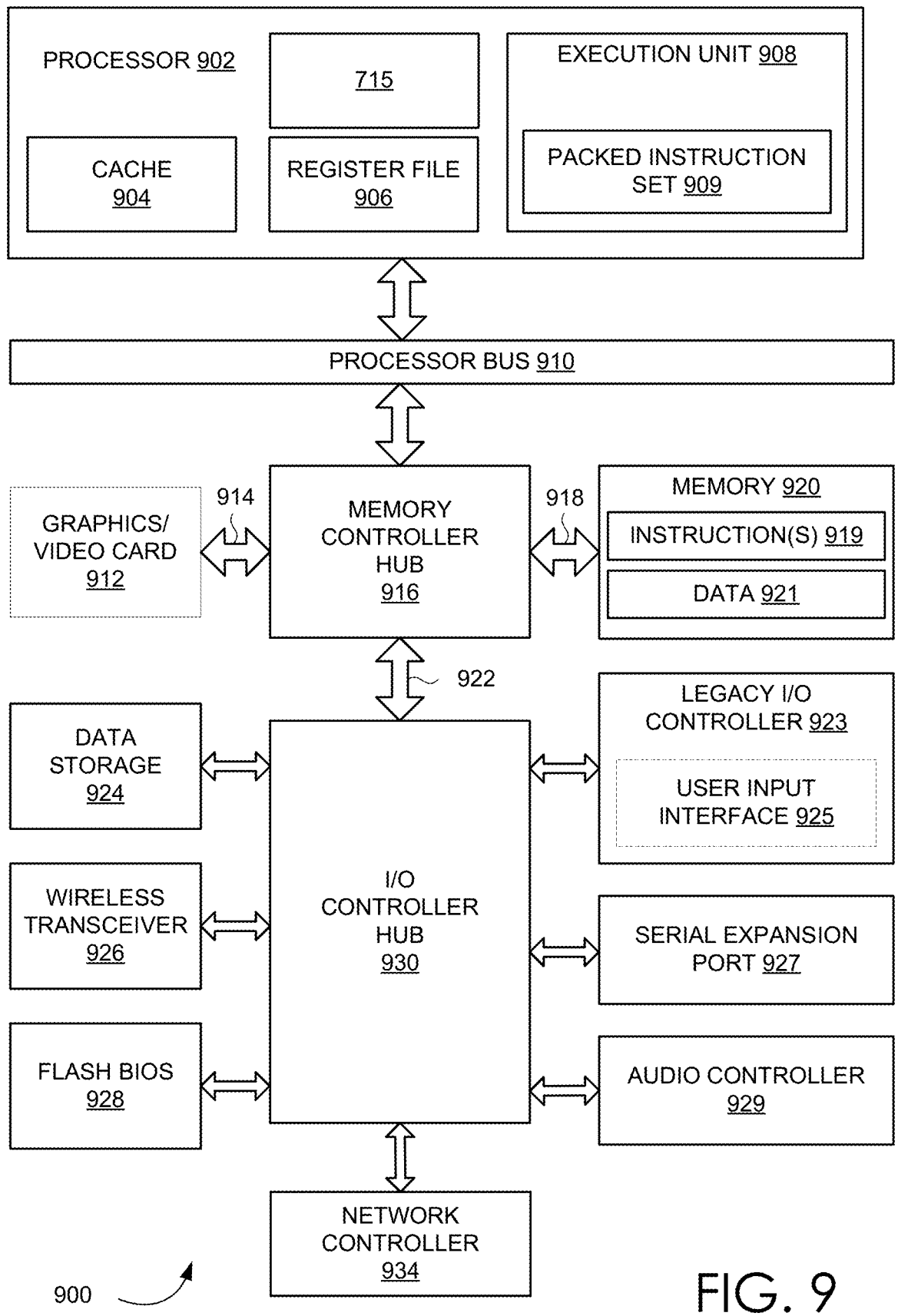
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xcon™, Itanium® XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word ("VLIW") computing microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to perform unsupervised domain transfer for one or more neural networks, as may include a feature extraction network and a classifier network.

Figure 10:
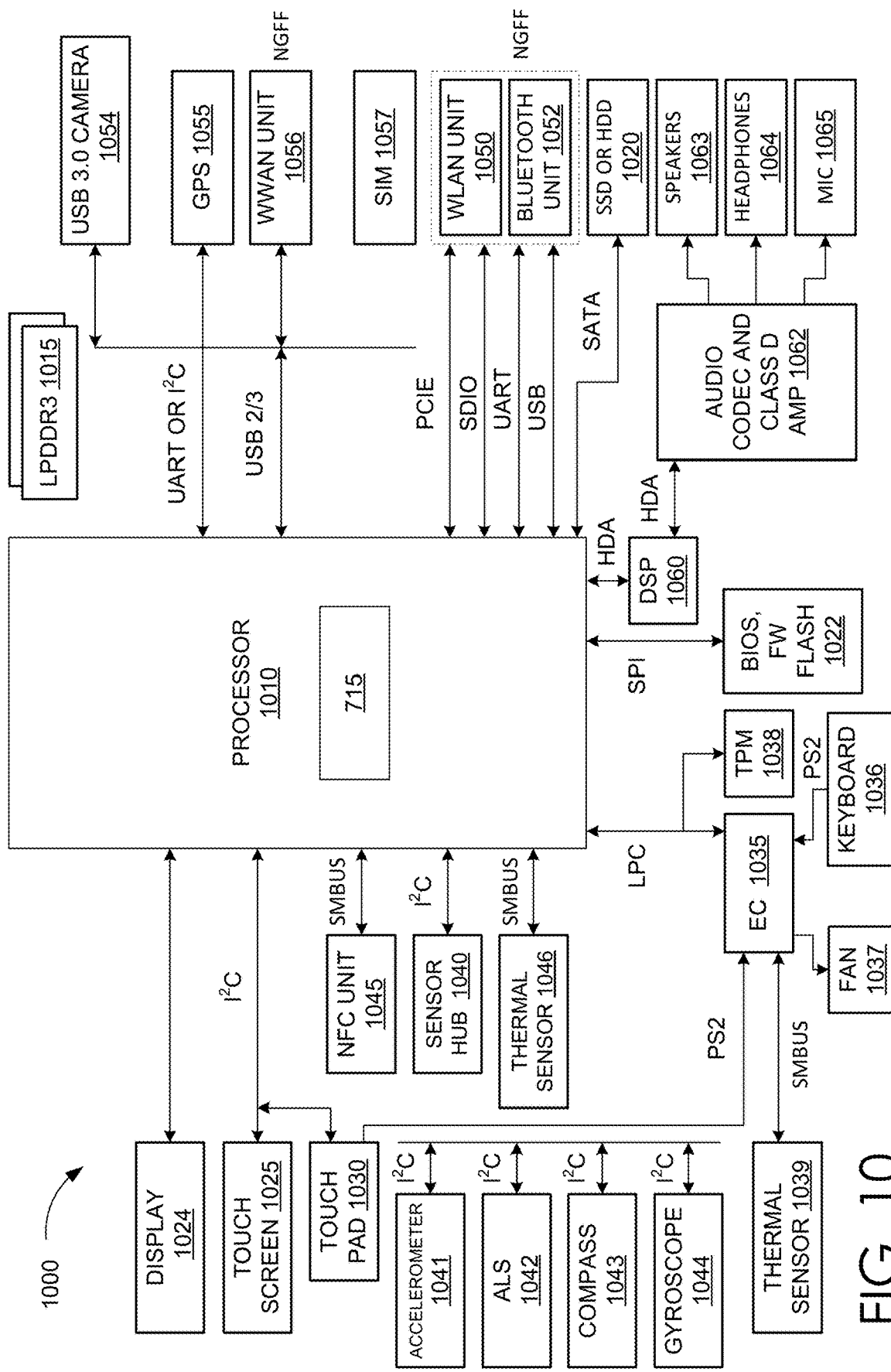
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to perform unsupervised domain transfer for one or more neural networks, as may include a feature extraction network and a classifier network.

Figure 11:
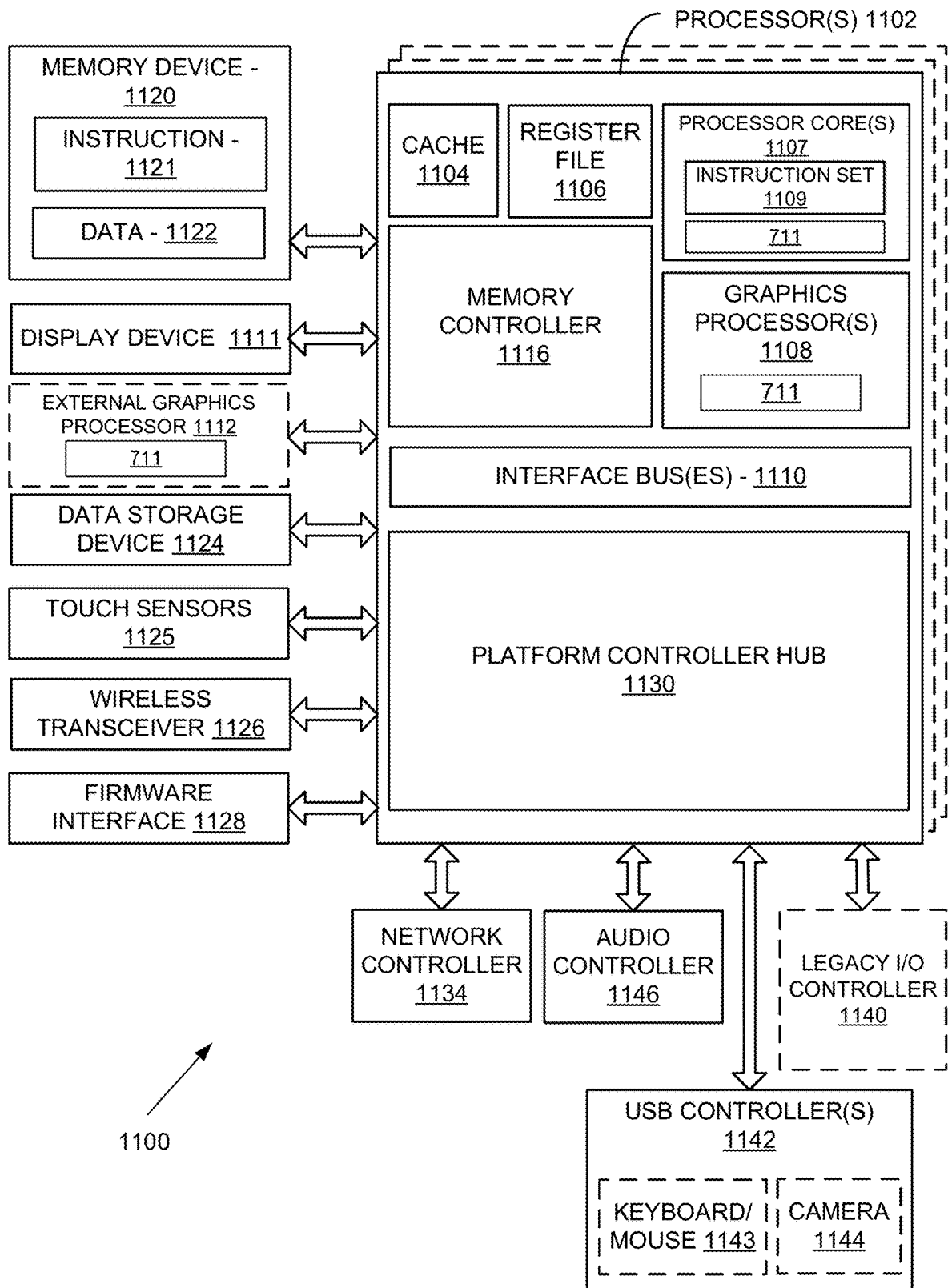
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, system 1100 can also include, coupled with, or be integrated within a wearable device, such as a smart watch wearable device, smart eyewear device, augmented reality device, or virtual reality device. In at least one embodiment, system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to perform unsupervised domain transfer for one or more neural networks, as may include a feature extraction network and a classifier network.

Figure 12:
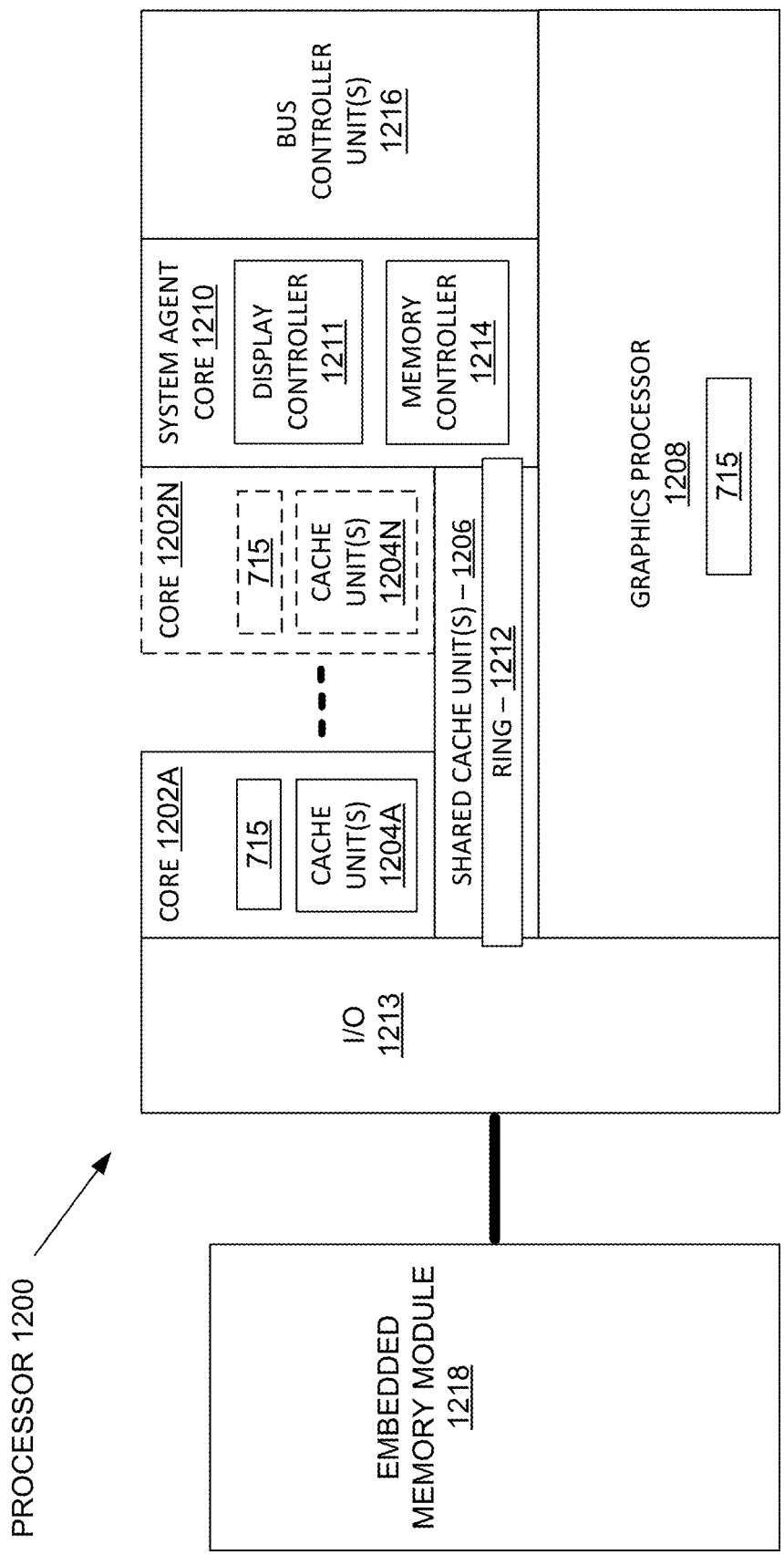
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with a ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory modules 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to perform unsupervised domain transfer for one or more neural networks, as may include a feature extraction network and a classifier network.

Virtualized Computing Platform

Figure 13:
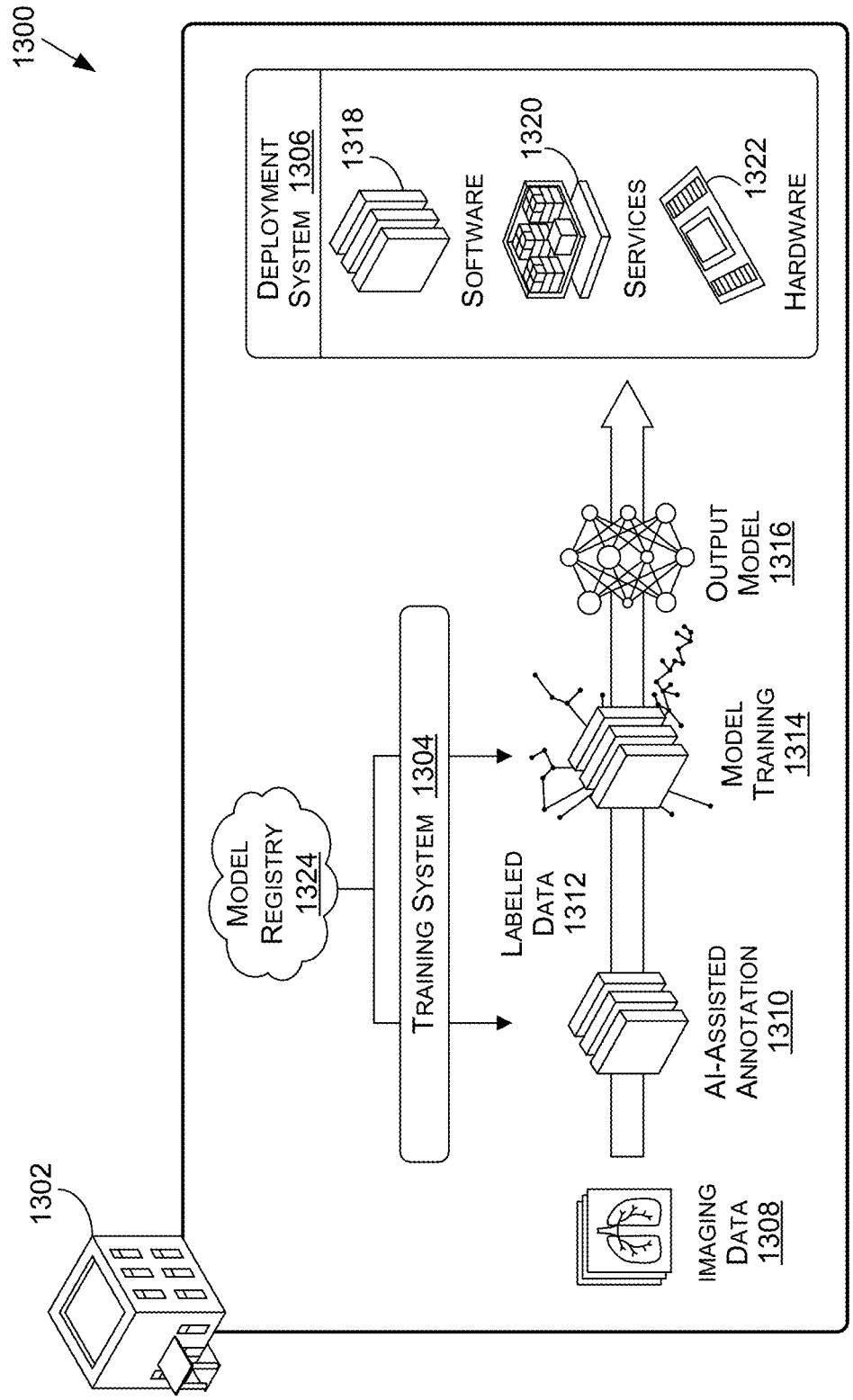
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., processor 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by process 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., process 1300 of FIG. 13). In at least one embodiment, completed and validated applications or containers may be stored in a container registry and associated machine learning models may be stored in model registry 1324. In at least one embodiment, a requesting entity-who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by services 1320 being required to have a respective instance of services 1320, services 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects ~such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
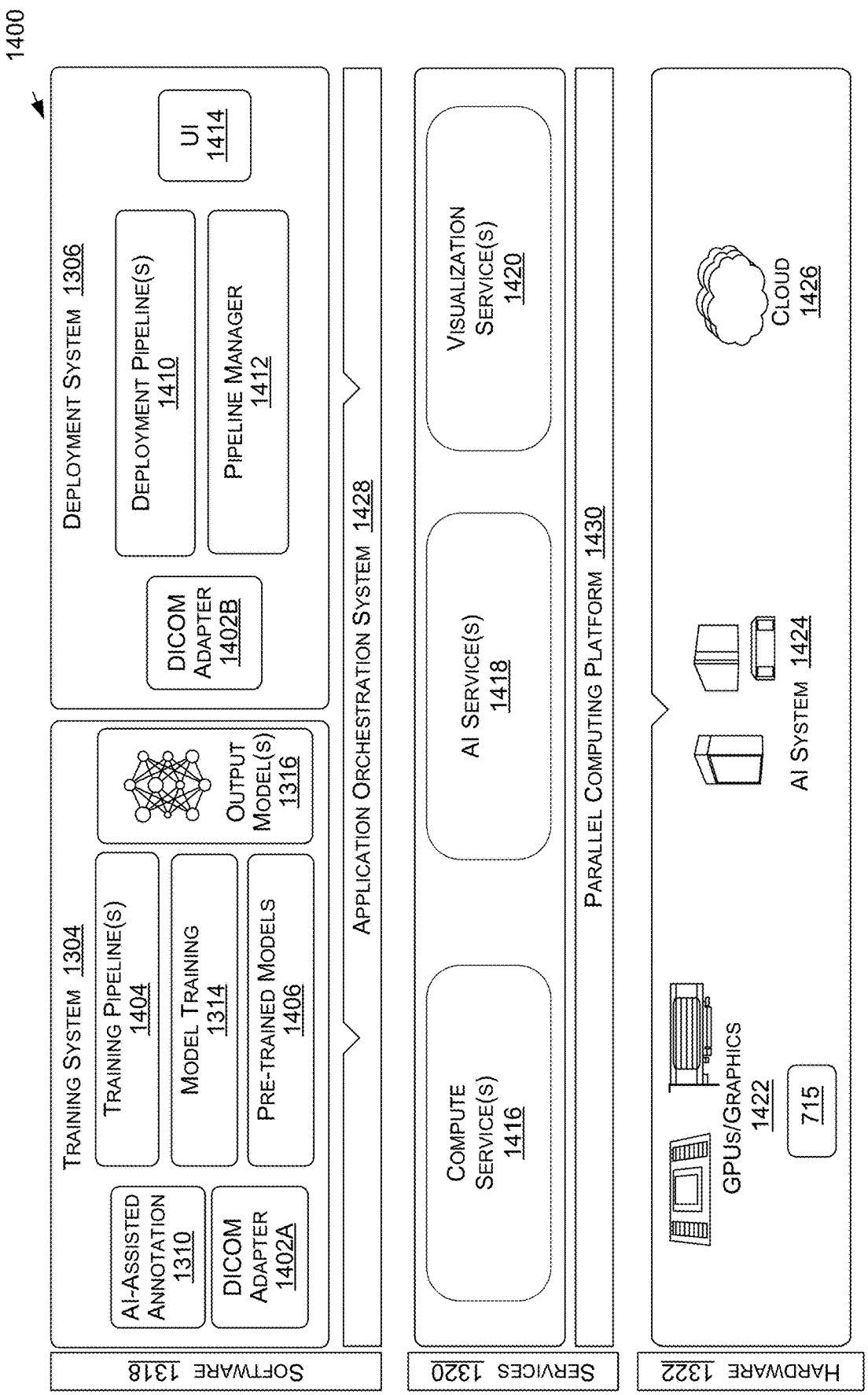
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipeline(s) 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption. In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained models 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipeline(s) 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
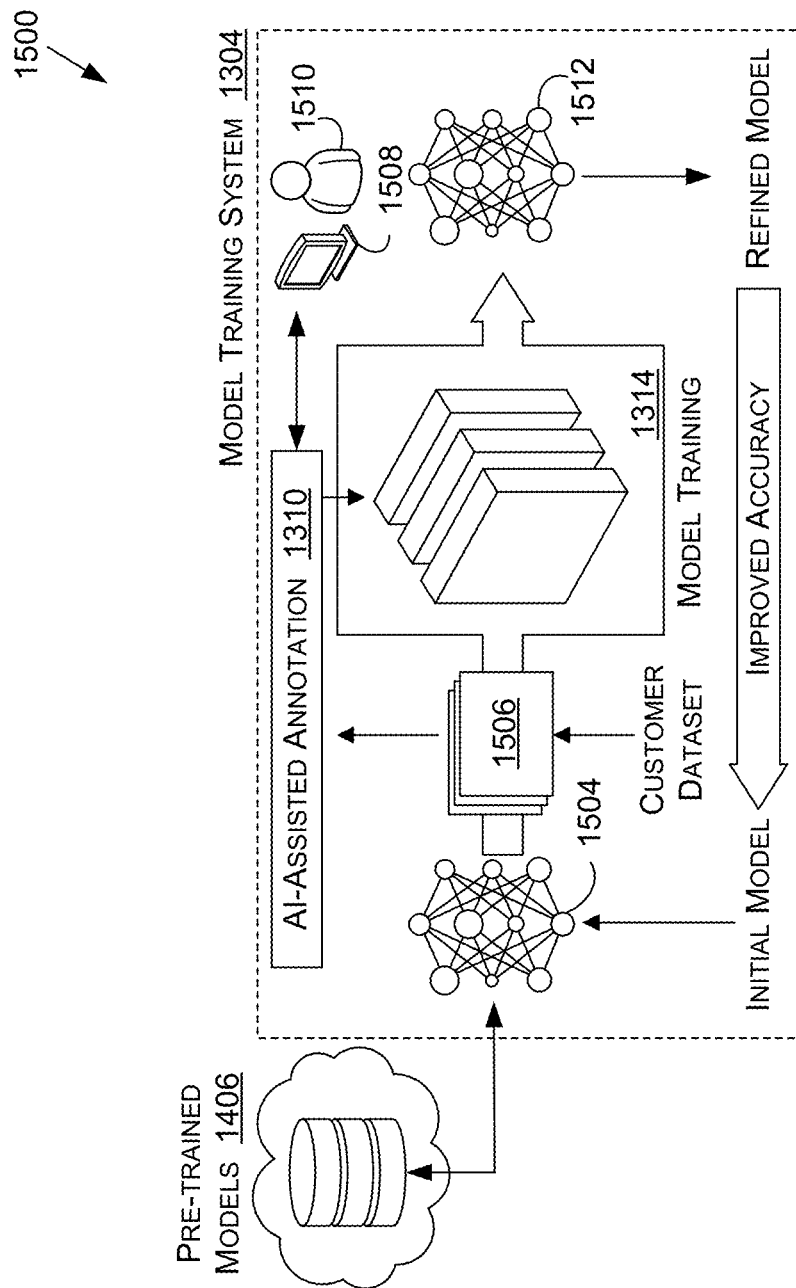
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where pre-trained models 1506 is trained at using patient data from more than one facility, pre-trained models 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained models 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

Figure 15B:
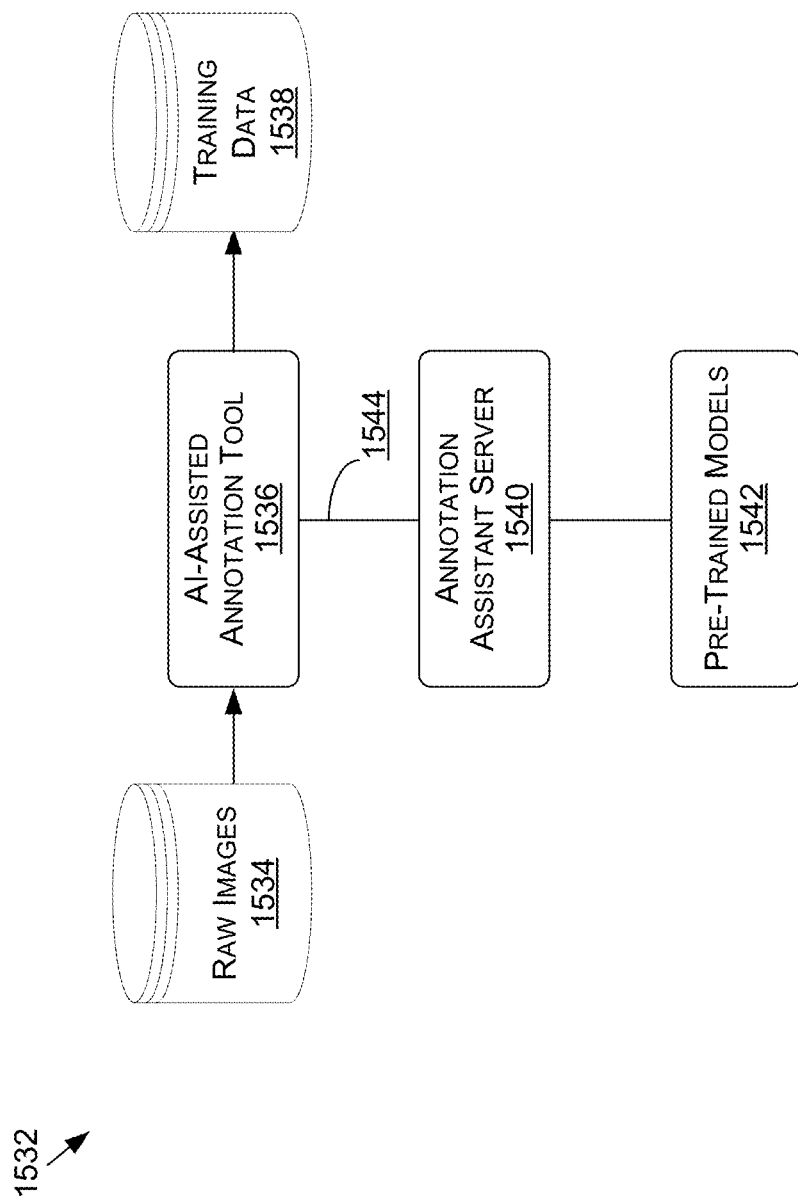

FIG. 15B is an example illustration of a client-server architecture 1532 to enhance annotation tools with pre-trained annotation models, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Such components can be used to perform unsupervised domain transfer for one or more neural networks, as may include a feature extraction network and a classifier network.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   receiving input data, the input data comprising unclassified data from an undetermined domain;
   encoding, using a first neural network and based on the unclassified data from the undetermined domain, a set of features into a latent space, the set of features being representative of the unclassified data and at least a portion of the set of features being agnostic to the undetermined domain; and
   providing the set of encoded features to a second neural network to cause the second neural network to generate an inference of at least one classification for the input data based at least in part on the set of encoded features.

2. The computer-implemented method of claim 1, further comprising:
inferring at least one domain classification for the input data using a third neural network and based at least in part on the set of encoded features.

3. The computer-implemented method of claim 2, wherein a shared loss function is used to update the first neural network, the second neural network, and the third neural network.

4. The computer-implemented method of claim 2, further comprising:
adjusting one or more network parameters for at least one of the first neural network, the second neural network, or the third neural network to enable the second neural network to accurately classify the set of encoded features, but to prevent the third neural network from inferring the undetermined domain.

5. The computer-implemented method of claim 1, wherein the first neural network is a feature extraction network and the second neural network is a data classifier network, and the feature extraction network and the data classifier network are trained using data from a set of domains including unlabeled data from a first domain and labeled data from a second domain.

6. The computer-implemented method of claim 1, wherein the second neural network is at least one of a convolutional neural network or a multi-level perceptron fully-connected network.

7. The computer-implemented method of claim 1, where the first neural network is a convolutional neural network and the second neural network is a two-layer neural network with a Leaky-ReLU activation function.

8. A processor, comprising:
one or more processing circuits to:
receive input data comprising unclassified data from an undetermined domain;
encode, using a first neural network and based on the unclassified data from the undetermined domain, a set of features into a latent space, the set of features being representative of the unclassified data;
infer at least one classification for the input data using a second neural network and based at least in part on the set of encoded features, wherein the second neural network is updated using at least one loss function shared with the first neural network and a third neural network; and
provide information for the at least one classification as an output.

9. The processor of claim 8, wherein the one or more processing circuits are further to:
infer at least one domain classification for the input data using a third neural network and based at least in part on the set of encoded features.

10. The processor of claim 9, wherein the at least one loss function is further shared with the third neural network.

11. The processor of claim 9, wherein the one or more processing circuits are further to:
adjust one or more network parameters for at least one of the first neural network, the second neural network, or the third neural network to enable the second neural network to accurately classify the set of encoded features, but to prevent the third neural network from inferring the undetermined domain.

12. The processor of claim 8, wherein the first neural network is a feature extraction network and the second neural network is a data classifier network, and the feature extraction network and the data classifier network are trained using data from a set of domains including unlabeled data from a first domain and labeled data from a second domain.

13. The processor of claim 8, wherein the processor is comprised in at least one of:
a system for performing simulation operations;
a system for performing simulation operations to test or validate autonomous machine applications;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system for performing natural language processing;
a system for performing operations for a conversational AI application;
a system implemented at least partially in a data center; or
a system implemented at least partially using cloud computing resources.

14. A system, comprising:
one or more processing units to encode, using a first neural network, a set of domain-agnostic features from unclassified data for an undetermined domain, and to infer, using a second neural network, at least one classification for the unclassified data using a second neural network, based at least on the set of encoded features.

15. The system of claim 14, wherein the one or more processing units are further to infer, using a third neural network, at least one domain classification for the unclassified data based at least on the set of encoded features.

16. The system of claim 15, wherein the one or more processing units are further to adjust one or more network parameters for at least one of the first neural network, the second neural network, or the third neural network to enable the second neural network to accurately classify the set of encoded features, but to prevent the third neural network from inferring the undetermined domain.

17. The system of claim 15, wherein the first neural network is a feature extraction network and the second neural network is a data classifier network, and the feature extraction network and the data classifier network are trained using data from a set of domains including unlabeled data from a first domain and labeled data from a second domain.

18. The system of claim 14, wherein the one or more processing units are further to update the second neural network using at least one loss function shared with the first neural network.

19. The system of claim 14, wherein the set of features are encoded into a latent space, encoded into a feature vector, or encoded into latent code.

20. The system of claim 14, wherein the system is comprised in at least one of:
a system for performing simulation operations;
a system for performing simulation operations to test or validate autonomous machine applications;
a system for performing deep learning operations;
a system implemented using an edge device;

a system for generating or presenting virtual reality (VR) content;
a system for generating or presenting augmented reality (AR) content;
a system for generating or presenting mixed reality (MR) content;
a system incorporating one or more Virtual Machines (VMs);
a system for performing natural language processing;
a system for performing operations for a conversational AI application;
a system implemented at least partially in a data center; or
a system implemented at least partially using cloud computing resources.

* * * * *